US009651935B2

(12) United States Patent
Stone

(10) Patent No.: US 9,651,935 B2
(45) Date of Patent: May 16, 2017

(54) LINE TRANSFER SYSTEM FOR AIRPLANE

(71) Applicant: The Boeing Company, Chicago, IL (US)

(72) Inventor: Patrick B. Stone, Monroe, WA (US)

(73) Assignee: THE BOEING COMPANY, Chicago, IL (US)

( * ) Notice: Subject to any disclaimer, the term of this patent is extended or adjusted under 35 U.S.C. 154(b) by 769 days.

(21) Appl. No.: 14/179,291

(22) Filed: Feb. 12, 2014

(65) Prior Publication Data

US 2014/0163715 A1 Jun. 12, 2014

Related U.S. Application Data

(63) Continuation of application No. 12/104,558, filed on Apr. 17, 2008, now Pat. No. 8,733,707.

(51) Int. Cl.
*G05B 19/402* (2006.01)
*B23P 19/10* (2006.01)
*B64F 5/00* (2017.01)

(52) U.S. Cl.
CPC .......... *G05B 19/402* (2013.01); *B23P 19/10* (2013.01); *B64F 5/0009* (2013.01); *B23P 2700/01* (2013.01)

(58) Field of Classification Search
CPC .... G05B 19/402; B23P 19/10; B23P 2700/01; B64F 5/0009
See application file for complete search history.

(56) References Cited

U.S. PATENT DOCUMENTS

| 4,212,443 A | 7/1980 | Duncan et al. |
| 4,224,507 A | 9/1980 | Gendreu |
| 4,303,978 A | 12/1981 | Shaw et al. |
| 4,382,282 A | 5/1983 | Graham et al. |
| 4,383,373 A | 5/1983 | Couturier |
| 4,483,080 A | 11/1984 | Knoll |

(Continued)

FOREIGN PATENT DOCUMENTS

| EP | 0957335 | 11/1999 |
| FR | 2821778 | 9/2002 |

(Continued)

OTHER PUBLICATIONS

International Searching Authority, "International Search Report," issued in connection with Application No. PCT/US2009/036194, Jun. 16, 2009, 4 pages.

(Continued)

*Primary Examiner* — Valentina Xavier
(74) *Attorney, Agent, or Firm* — Hanley, Flight & Zimmerman, LLC

(57) ABSTRACT

A method is provided for establishing a physical reference inside an airplane representing the airplane's optimized line of flight based on the as-built orientation of aerodynamically significant features of the airplane. Values generated for aerodynamic pitch, roll and yaw representing the optimized line of flight are used to orient a tool reference surface outside the airplane. The orientation of the tool reference surface is recorded using an inertial reference unit placed on the tool reference surface. The tool reference surface and inertial reference unit are moved into the airplane where they are used to establish the physical reference on the airframe.

13 Claims, 17 Drawing Sheets

(56) References Cited

U.S. PATENT DOCUMENTS

| | | | |
|---|---|---|---|
| 4,538,779 A | 9/1985 | Goldstein | |
| 4,599,070 A | 7/1986 | Hladky et al. | |
| 4,663,855 A | 5/1987 | Hamilton et al. | |
| 4,691,446 A | 9/1987 | Pitches et al. | |
| 4,730,793 A | 3/1988 | Thurber, Jr. et al. | |
| 4,825,375 A | 4/1989 | Nadkarni et al. | |
| 4,968,879 A | 11/1990 | Clark | |
| 5,021,982 A | 6/1991 | Crosbie et al. | |
| 5,186,416 A | 2/1993 | Fabre et al. | |
| 5,245,909 A | 9/1993 | Corrigan et al. | |
| 5,319,744 A | 6/1994 | Kelly et al. | |
| 5,452,516 A | 9/1995 | Schegerin | |
| 5,619,323 A | 4/1997 | Hamilton et al. | |
| 5,646,525 A | 7/1997 | Gilboa | |
| 5,649,064 A | 7/1997 | Jorgensen et al. | |
| 5,659,939 A | 8/1997 | Whitehouse | |
| 5,689,682 A | 11/1997 | Peasley et al. | |
| 5,757,499 A | 5/1998 | Eaton | |
| 5,793,483 A | 8/1998 | Zehnpfenning et al. | |
| 5,852,237 A | 12/1998 | Renshaw | |
| 5,920,394 A | 7/1999 | Gelbart et al. | |
| 5,951,608 A | 9/1999 | Osder | |
| 6,166,809 A | 12/2000 | Pettersen et al. | |
| 6,167,607 B1* | 1/2001 | Pryor | A01B 69/008 29/407.04 |
| 6,205,636 B1 | 3/2001 | Abe et al. | |
| 6,230,382 B1* | 5/2001 | Cunningham | B64F 5/0009 29/407.04 |
| 6,230,383 B1 | 5/2001 | Welleman et al. | |
| 6,452,668 B1 | 9/2002 | Pratt | |
| 6,457,672 B1 | 10/2002 | Tai | |
| 6,501,543 B2 | 12/2002 | Hedges et al. | |
| 6,535,282 B2 | 3/2003 | Hedges et al. | |
| 6,618,133 B2 | 9/2003 | Hedges et al. | |
| 6,630,993 B1 | 10/2003 | Hedges et al. | |
| 6,763,325 B1 | 7/2004 | Stone | |
| 6,901,673 B1 | 6/2005 | Cobb et al. | |
| 7,194,326 B2* | 3/2007 | Cobb | G05B 19/41805 700/114 |
| 7,305,277 B2 | 12/2007 | Freeman et al. | |
| 7,337,650 B1 | 3/2008 | Preston et al. | |
| 7,614,154 B2 | 11/2009 | Cobb | |
| 7,869,895 B2 | 1/2011 | Jones | |
| 7,917,242 B2* | 3/2011 | Jones | B64F 5/0009 29/281.4 |
| 7,978,322 B2* | 7/2011 | Marsh | G01B 11/002 250/231.13 |
| 8,005,563 B2* | 8/2011 | Cobb | B64F 5/0009 29/407.1 |
| 8,326,587 B2 | 12/2012 | Barnes et al. | |
| 8,606,388 B2* | 12/2013 | Cobb | B64F 5/0009 29/407.09 |
| 8,620,470 B2* | 12/2013 | Cobb | B64F 5/0009 29/407.1 |
| 8,733,707 B2 | 5/2014 | Stone | |
| 2003/0090682 A1 | 5/2003 | Gooch et al. | |
| 2003/0191561 A1 | 10/2003 | Vos | |
| 2004/0188025 A1* | 9/2004 | Anderson | B29C 33/505 156/382 |
| 2005/0150121 A1 | 7/2005 | Jaklitsch et al. | |
| 2005/0172470 A1 | 8/2005 | Cobb et al. | |
| 2005/0228613 A1 | 10/2005 | Fullerton et al. | |
| 2005/0248444 A1 | 11/2005 | Joao | |
| 2006/0032970 A1 | 2/2006 | Allen | |
| 2006/0212182 A1 | 9/2006 | Shaw | |
| 2006/0224268 A1 | 10/2006 | Freeman et al. | |
| 2006/0244637 A1 | 11/2006 | Baranov et al. | |
| 2007/0010920 A1 | 1/2007 | Lebrun et al. | |
| 2007/0095135 A1 | 5/2007 | Rueger | |
| 2007/0102575 A1 | 5/2007 | Morgan et al. | |
| 2007/0103340 A1 | 5/2007 | Baranov et al. | |
| 2008/0046109 A1 | 2/2008 | Freeman et al. | |
| 2008/0172857 A1 | 7/2008 | Brinkworth et al. | |
| 2009/0086199 A1 | 4/2009 | Troy et al. | |
| 2009/0112348 A1* | 4/2009 | Jones | B64F 5/0009 700/114 |
| 2009/0112349 A1* | 4/2009 | Cobb | B64F 5/0009 700/114 |
| 2009/0151143 A1 | 6/2009 | Jones | |
| 2009/0157363 A1 | 6/2009 | Barnes et al. | |
| 2010/0042270 A1 | 2/2010 | Villaume | |
| 2010/0085437 A1 | 4/2010 | Troy et al. | |
| 2011/0270571 A1* | 11/2011 | Cobb | B64F 5/0009 702/150 |
| 2011/0276172 A1* | 11/2011 | Cobb | B64F 5/0009 700/114 |

FOREIGN PATENT DOCUMENTS

| | | |
|---|---|---|
| JP | 2006051557 | 2/2006 |
| WO | 9428375 | 12/1994 |
| WO | 2007101475 | 9/2007 |
| WO | 2009128992 | 10/2009 |

OTHER PUBLICATIONS

International Searching Authority, "International Preliminary Report on Patentability and Written Opinion," issued in connection with Application No. PCT/US2009/036194, Oct. 19, 2010, 7 pages.

International Searching Authority, "International Preliminary Report on Patentability and Written Opinion," issued in connection with Application No. PCT/US2008/078456, Apr. 27, 2010, 7 pages.

Briley et al., "An overview and Generalization of implicit Navier-Stokes algorithms and approximate factorization," Computers and Fluids, 2001. (Copy not provided; available in USPTO records as cited by examiner in U.S. Appl. No. 12/002,147).

Zingg, D.W., "Fundamentals of Computational Fluid Dynamics", NASA Ames Research Center, Aug. 26, 1999, 275 pages.

Williams et al., "Automated Positioning and Alignment Systems," Advanced Integration Technology, Inc., Society of Automated Engineers, Inc., Automated Fastening Conference & Exposition, Sep. 2000, 9 pages.

Jihua et al., "Research for Major-Parts Digital Assembly System of Large-Scale Airplane," Proceedings of the 5th WSEAS International Conference on Circuits, Systems, Electronics, Control & Signal Processing; Dallas, Texas; Nov. 2006, 7 pages.

International Searching Authority, "International Search Report and Written Opinion," issued in connection with Application No. PCT/US2008/078456, Jan. 28, 2009, 7 pages.

United States Patent and Trademark Office, "Notice of Allowance," issued in connection with U.S. Appl. No. 13/183,002, Dec. 18, 2013, 11 pages.

United States Patent and Trademark Office, "Notice of Allowance," issued in connection with U.S. Appl. No. 13/183,096, Dec. 19, 2013, 15 pages.

United States Patent and Trademark Office, "Office Action," issued in connection with U.S. Appl. No. 12/104,558, Jun. 13, 2011, 10 pages.

United States Patent and Trademark Office, "Office Action," issued in connection with U.S. Appl. No. 12/104,558, Sep. 19, 2011, 14 pages.

United States Patent and Trademark Office, "Office Action," issued in connection with U.S. Appl. No. 12/104,558, Apr. 27, 2012, 10 pages.

United States Patent and Trademark Office, "Office Action," issued in connection with U.S. Appl. No. 12/104,558, Dec. 6, 2012, 8 pages.

United States Patent and Trademark Office, "Office Action," issued in connection with U.S. Appl. No. 12/104,558, Jun. 13, 2013, 7 pages.

United States Patent and Trademark Office, "Notice of Allowance," issued in connection with U.S. Appl. No. 12/104,558, Nov. 22, 2013, 28 pages.

* cited by examiner

| | | LSMA Values | | | | | As-Built Data | | | | | Calculation Results | | | | | | | |
|---|---|---|---|---|---|---|---|---|---|---|---|---|---|---|---|---|---|---|---|
| | | A | B | C | D | E | F | G | H | J | I | K | L | M | N | O | P | Q | R | S |
| | | | Target Name | A/P X axis Value | A/P Y axis Value | A/P Z axis Value | | Target Name | A/P X axis Value | A/P Y axis Value | A/P Z axis Value | | Item | x | y | z | u | v | w | Error code |
| 7 | | 41S1L | | | | | 41S1L | | | | | Sec 41 | 0.000 | 0.000 | 0.000 | 0.000 | 0.000 | 0.000 | 0 |
| 8 | Sec 41 Circ. Tgts | 41S1R | | | | | 41S1R | | | | | Sec 43 | 0.000 | 0.000 | 0.000 | 0.000 | 0.000 | 0.000 | 0 |
| 9 | | 41S20L | | | | | 41S20L | | | | | Sec 46 | 0.000 | 0.000 | 0.000 | 0.000 | 0.000 | 0.000 | 0 |
| 10 | | 41S21L | | | | | 41S21L | | | | | Sec 47 | 20.000 | 0.000 | 0.000 | 0.000 | 0.000 | 0.000 | 0 |
| 11 | | 41S20R | | | | | 41S20R | | | | | 43-46 | 0.000 | 0.000 | 0.000 | 0.000 | 0.000 | 0.000 | 0 |
| 12 | | 41S21R | | | | | 41S21R | | | | | Lft SOB | 0.000 | 0.000 | 0.000 | 0.000 | 0.000 | 0.000 | 0 |
| 13 | | 41S20R | | | | | 41S20R | | | | | Lft Wing | 0.000 | 0.000 | 0.000 | 0.000 | 0.000 | 0.000 | 0 |
| 14 | | 41S40L | | | | | 41S40L | | | | | Rgt SOB | 0.000 | 0.000 | 0.000 | 0.000 | 0.000 | 0.000 | 0 |
| 15 | Sec 41 Floor | 41ST66L | | | | | 41ST66L | | | | | Rgt Wing | 0.000 | 0.000 | 0.000 | 0.000 | 0.000 | 0.000 | 0 |
| 16 | | 41ST66R | | | | | 41ST66R | | | | | | | | | | | | |
| 17 | | | | | | | | | | | | | | | | | | | |
| 18 | | 43S1L | | | | | 43S1L | | | | | | | | | | | | |
| 19 | Sec 43 Circ. Tgts | 43S1R | | | | | 43S1R | | | | | | | | | | | | |
| 20 | | 43S20L | | | | | 43S20L | | | | | | | | | | | | |
| 21 | | 43S21L | | | | | 43S21L | | | | | | | | | | | | |
| 22 | | 43S20R | | | | | 43S20R | | | | | | | | | | | | |
| 23 | | 43S21R | | | | | 43S21R | | | | | | | | | | | | |
| 24 | | 43S20R | | | | | 43S20R | | | | | | | | | | | | |
| 25 | | 43S40L | | | | | 43S40L | | | | | | | | | | | | |
| 26 | Sec 43 Floor | 43ST66L | | | | | 43ST66L | | | | | | | | | | | | |
| 27 | | 43ST66R | | | | | 43ST66R | | | | | | | | | | | | |
| 28 | | 46S1L | | | | | 46S1L | | | | | | | | | | | | |
| 29 | Sec 46 Circ. Tgts | 46S1R | | | | | 46S1R | | | | | | | | | | | | |
| 30 | | 46S20L | | | | | 46S20L | | | | | | | | | | | | |
| 31 | | 46S21L | | | | | 46S21L | | | | | | | | | | | | |
| 32 | | 46S20R | | | | | 46S20R | | | | | | | | | | | | |
| 33 | | 46S21R | | | | | 46S21R | | | | | | | | | | | | |
| 34 | | 46S20R | | | | | 46S20R | | | | | | | | | | | | |
| 35 | | 46S40L | | | | | 46S40L | | | | | | | | | | | | |
| 36 | Sec 46 Floor | 46ST66L | | | | | 46ST66L | | | | | | | | | | | | |
| 37 | | 46ST66R | | | | | 46ST66R | | | | | | | | | | | | |
| 38 | | | | | | | | | | | | | | | | | | | |
| 39 | | 47S1L | 1000.000 | -38.268 | 92.388 | | 47S1L | 1023.651 | 12.654 | | | | | | | | | | |
| 40 | Sec 47 Circ. Tgts | 47S1R | 1000.000 | 38.268 | 92.388 | | 47S1R | 1019.346 | 89.074 | | | | | | | | | | |
| 41 | | 47S20L | 1000.000 | -92.388 | 38.268 | | 47S20L | 1024.168 | -40.543 | | | | | | | | | | |
| 42 | | 47S21L | 1000.000 | 92.388 | 38.268 | | 47S21L | 1014.611 | 143.957 | | | | | | | | | | |
| 43 | | 47S20R | 1000.000 | -92.388 | -38.268 | | 47S20R | 1021.431 | -39.349 | | | | | | | | | | |
| 44 | | 47S21R | 1000.000 | 92.388 | -38.268 | | 47S21R | 1011.874 | 145.151 | | | | | | | | | | |
| 45 | | 47S20R | 1000.000 | -38.268 | -92.388 | | 47S20R | 1016.697 | 15.534 | | | | | | | | | | |
| 46 | | 47S20L | 1000.000 | 38.268 | -92.388 | | 47S20L | 1012.738 | -91.957 | | | | | | | | | | |
| 47 | Sec 47 Floor | 47ST66L | 950.000 | -50.000 | 50.000 | | 47ST66L | 972.494 | -1.017 | | | | | | | | | | |
| 48 | | 47ST66R | 950.000 | 50.000 | 50.000 | | 47ST66R | 967.322 | 98.834 | | | | | | | | | | |

| | AB | AC | AD | AE | AF | AG | AH | AI | AK | AL |
|---|---|---|---|---|---|---|---|---|---|---|
| 1 | Dynamic Axis Values | Jack Name | X Axis Delta Nom | Y Axis Delta Nom | Z Axis Delta Nom | Dynamic Section-Wing Angles | | | | |
| 2 | Section 41 Axis Positions | FLF | 0.0000 | 0.0000 | 0.0000 | | | | | |
| 3 | | FRF | 0.0000 | 0.0000 | 0.0000 | Roll | 0.000 | | Roll | 0.000 |
| 4 | | FLR | 0.0000 | 0.0000 | 0.0000 | Pitch | 0.000 | | Pitch | 0.000 |
| 5 | | FRR | 0.0000 | 0.0000 | 0.0000 | Yaw | 0.000 | | Yaw | 0.000 |
| 6 | Section 47 Axis Positions | ALF | 0.0000 | 0.0000 | 0.0000 | | | | | |
| 7 | | ARF | 0.0000 | 0.0000 | 0.0000 | Roll | 0.000 | | Roll | 0.000 |
| 8 | | ALR | 0.0000 | 0.0000 | 0.0000 | Pitch | 0.000 | | Pitch | 0.000 |
| 9 | | ARR | 0.0000 | 0.0000 | 0.0000 | Yaw | -0.115 | | Yaw | -0.115 |
| 10 | LW Axis Positions | LWI | 0.0000 | 0.0000 | 0.0000 | | | | | |
| 11 | | LWA | 0.0000 | 0.0000 | 0.0000 | Roll | 0.000 | | Roll | 0.000 |
| 12 | | LWO | 0.0000 | 0.0000 | 0.0000 | Pitch | 0.000 | | Pitch | 0.000 |
| 13 | | | | | | Yaw | 0.000 | | Yaw | 0.000 |
| 14 | RW Axis Positions | RWI | 0.0000 | 0.0000 | 0.0000 | | | | | |
| 15 | | RWA | 0.0000 | 0.0000 | 0.0000 | Roll | 0.000 | | Roll | 0.000 |
| 16 | | RWO | 0.0000 | 0.0000 | 0.0000 | Pitch | 0.000 | | Pitch | 0.000 |
| 17 | | | | | | Yaw | 0.000 | | Yaw | 0.000 |
| 18 | ACTUAL JACK DELTAS FROM LSMA SET POSITIONS AT FINAL SET | | | | | | | | Orientation wrt ERS at final set | |

Outputs to Angles_at_final_set worksheet

~133
~136
~134

LINE TRANSFER SYSTEM FOR AIRPLANE

CROSS REFERENCE TO RELATED APPLICATIONS

This patent arises from a continuation of U.S. patent application Ser. No. 12/104,558, filed on Apr. 17, 2008, now U.S. Pat. No. 8,733,707, which is hereby incorporated herein by reference in its entirety.

TECHNICAL FIELD

This disclosure generally relates to techniques used for final assembly of major airplane components, such as the attachment of wings, tail assemblies and fuselage sections, and deals more particularly with a system for establishing a physical reference inside the airplane representing the optimum line of flight for the airplane based on the as-built orientation of the components.

BACKGROUND

The final assembly of large vehicles such as airplanes is typically performed on a factory floor where large scale components are moved into final assembly positions. In the case of an airplane, fuselage sections, wings and tail assemblies are placed on assembly jacks that are used to locate, align and move the components into their final assembly positions where they are permanently joined together.

Slight variations of the as-built positions of the airplane components from nominal positions may alter the relative orientation of aerodynamically significant features of the airplane such as wings and the vertical stabilizer. The orientation of these aerodynamically significantly features can affect the trimmed cruise configuration of the airplane, also referred to herein as the "line of flight" of the airplane. Because of these variations, The line of flight must be established for each airplane, as built.

Currently, after an airplane has been assembled, the line of flight for the as-built airplane is established by making physical measurements of the airplane's airframe and then estimating the line of flight based on the measurements. A physical reference is then created inside the airplane that represents the estimated line of flight. This physical reference, sometimes referred to as a "golden plate", is used as a reference to calibrate avionics and other flight controls used by pilots to navigate and control the airplane. In some cases, the estimated line of flight represented by the golden plate may not be entirely accurate because the estimation process does not take into consideration the relative orientation of the aerodynamically significant features which may vary from airplane-to-airplane, as built. As a result, flight controls must sometimes trim rudder angle to agree with the estimated line of flight, causing the airframe to unnecessarily yaw, thereby creating an asymmetrical wing sweep condition. Asymmetric wing sweep exhibits asymmetrical lift characteristics that require aileron trim in order to prevent roll of the airframe in flight, in turn producing drag that negatively affects fuel burn performance.

Accordingly, there is a need for a system for accurately determining the line of flight for an airplane, as built that takes into consideration the relative orientation of aerodynamically significant features of the airplane. There is also a need for a final assembly jacking system capable of initializing itself to a common airframe coordinate reference network, which may be used in a method for determining the optimized line of flight for the airplane.

SUMMARY

The disclosed embodiments provide a method of establishing a physical reference within an airplane that represents an optimized line of flight for the airplane, as built. The physical reference is recorded on the airplane's airframe, and reflects the as-built orientation of aerodynamically significant features of the airplane, thus establishing a more accurate physical reference for initializing and calibrating flight controls, including avionics. Essentially, the disclosed embodiments provide a system and method for transferring an external airplane adjustment system into the interior of the airplane, referred to herein as line transfer.

The disclosed embodiments provide a closed loop servo feedback positioning system that aligns major airframe components such as wing sections and fuselage sections, via an external spatial measurement system input file. This externally generated input file is used to initialize the servo system such that the alignment process requires commanding the system to the initialized 0,0,0 positional coordinates. This effectively converts the positioning system into a coordinate measuring machine initialized to production component fiducials.

After the components the airplane have been joined together, the final servo positions are output to a line transfer tool which uses the final wing angle of attack, wing sweep and tail section pitch, roll and yaw angles to determine the calculated, optimized aerodynamic pitch, roll and yaw of the entire airframe. Using these optimized values for pitch, roll and yaw, the line transfer tool is commanded to pitch, roll and yaw an integrated tool reference surface into agreement with the calculated values using a secondary spatial measurement system. An inertial reference unit (IRU) is indexed to the line transfer tool surface orientation. The IRU is then used to transfer the orientation of the tool reference surface into the aircraft where it is used to align a physical reference representing the optimized line of flight. The physical reference is then subsequently used to calibrate flight controls and avionics of the airplane. Use of an accurately oriented physical reference optimizes the avionics installation based on the unique characteristics of each specific airframe which are determined by its aerodynamic features.

According to one disclosed method embodiment, a physical reference is established within an airplane representing an optimized line of flight, comprising: generating values for aerodynamic pitch, roll and yaw representing the optimized line of flight; orienting a tool reference surface outside the airplane using the generated values for aerodynamic pitch, roll and yaw; recording the orientation of the tool reference surface; moving the tool reference surface from outside the airplane to a location inside the airplane; and, establishing the physical reference inside the airplane using the tool reference surface and the recorded orientation. The method may further include determining the orientation of at least one aerodynamically significant feature of the aircraft after the aircraft has been assembled. Generating the values for aerodynamic pitch, roll and yaw may be performed by using the results of the determination of the orientation of the at least one aerodynamically significant feature. The tool reference surface may be oriented outside the airplane using servo motors and the orientation of the tool reference surface may be recorded using an inertial reference unit. The physical reference inside the airplane may be established by supporting the tool reference surface on at least three hard points within the airplane, and adjusting the dimensions of one or more of the hard points in order to alter the orientation of the tool reference surface to match the orientation recorded outside the airplane.

According to another embodiment, a method is provided of establishing a physical reference on the airframe of an airplane representing an optimized line of flight, comprising: generating a data file representing the as-built orientation of one or more aerodynamically significant features of the airplane; using the data file to generate values for aerodynamic pitch, roll and yaw of the airframe representing the optimized line of flight; orienting a reference tool outside the airplane to substantially match the generated values for aerodynamic pitch, roll and yaw; recording the orientation of the reference tool using an inertial reference unit; transferring the recorded orientation of the reference tool from outside the airplane to a location inside the airplane; and, using the recorded orientation transferred to the location inside the airplane to establish the physical reference. Recording the orientation of the reference tool may be performed using an inertial reference unit, and transferring the recorded orientation may include moving the inertial reference unit from outside the airplane to a location inside the airplane. Generating the data file may include recording the position of jacks used to move components to the airplane during assembly of the airplane, and measuring the position of the at least one or more aerodynamically significant features of the airplane after the components have been assembled. The tool may be oriented using at least three servo motors to displace the reference tool along pitch, roll and yaw axes.

According to another embodiment, a system is provided for establishing a physical reference within an airplane representing an optimized line of flight, comprising: a tool positioned outside the airplane and including a tool reference surface; means for calculating values for aerodynamic pitch, roll and yaw of the airplane representing the optimized line of flight; means coupled with the calculating means for moving the tool reference surface to an orientation corresponding to the calculated values for aerodynamic pitch, roll and yaw of the airplane; and, means for transferring the orientation of the tool reference to a location inside the airplane. The system may further comprise means for generating a data file representing the as-built orientation of at least one aerodynamically significant feature of the airplane, and the calculating means may use the data file to calculate the values of aerodynamic pitch, roll and yaw representing the optimized line of flight. The means for moving the tool reference surface may include servo motors, and the means for transferring the orientation of the tool reference surface may include means mounted on the tool reference surface for recording the orientation of the tool reference surface. The tool reference surface may be removably mounted on the tool to allow the tool reference surface to be moved into the airplane.

According to still another embodiment, a system is provided for assembling and optimizing a line of flight of an airplane, comprising: a jacking system including servos for moving components of the airplane into a final assembly position; a tool including a moveable tool reference surface; means for calculating values for aerodynamic pitch, roll and yaw of the airplane representing the optimized line of flight based on the position of the jacking system servos; means coupled with the calculating means for moving the tool reference surface to an orientation corresponding to the calculated values for aerodynamic pitch, roll and yaw of the airplane; and, means for transferring the orientation of the tool reference surface to a physical reference inside the airplane. The tool may include a tool base disposed outside of the airplane, and the tool reference surface may be removably mounted on the tool base. The means for transferring the orientation may include an inertial reference unit mounted on the tool reference surface. The tool reference surface may include guides for establishing the physical reference inside the airplane. The means for moving the tool reference surface may include at least three servo motors for controlling the pitch and roll of the tool reference surface, and a fourth servo motor for controlling the yaw of the tool reference surface.

The disclosed embodiments satisfy the need for a system for establishing an accurate line of flight for the airplane which reflects the relative orientation of aerodynamically significant features of the airplane, as built.

Other features, benefits and advantages of the disclosed embodiments will become apparent from the following description of embodiments, when viewed in accordance with the attached drawings and appended claims

BRIEF DESCRIPTION OF THE ILLUSTRATIONS

FIG. 1 is a perspective view of an airplane illustrating pitch, roll and yaw axes of the airplane.

FIGS. 2A, 2B, and 2C illustrate aspects of predicting cruise orientation of the airplane.

FIGS. 8A-8C are screen shots of an illustrative, non-limiting implementation of computing assembly jack locations to align components for assembly.

DETAILED DESCRIPTION

Figure 1:
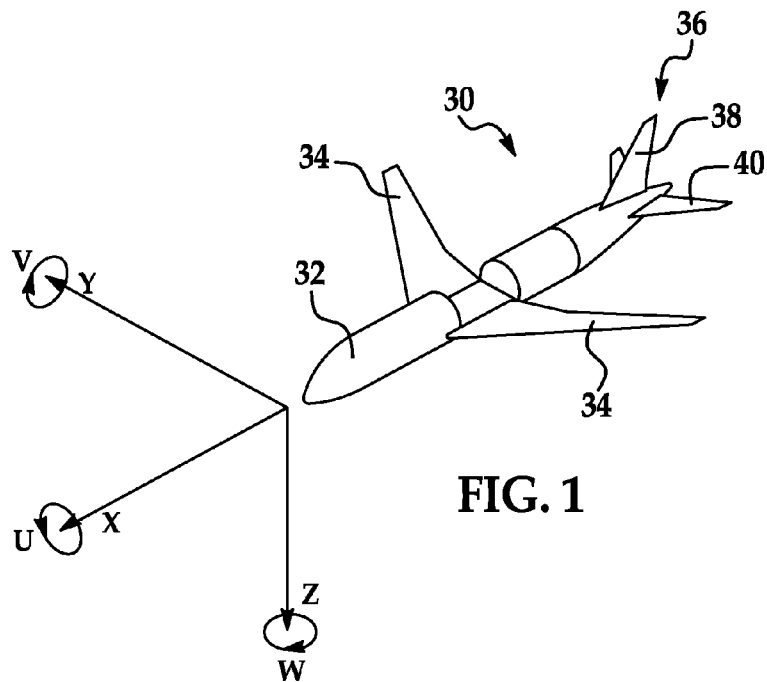

Referring to FIG. 1, the nominal orientation of an as-built airplane 30 may be defined in the context of a coordinate system that includes an X axis, a Y axis, and a Z axis. Variation from the nominal orientation is suitably measured as angular rotation, or angular offset, about the axes. For example, angular rotation U represents angular offset about the X axis; angular rotation V represents angular offset about the Y axis; and angular rotation W represents angular offset about the Z axis.

Figure 2A:
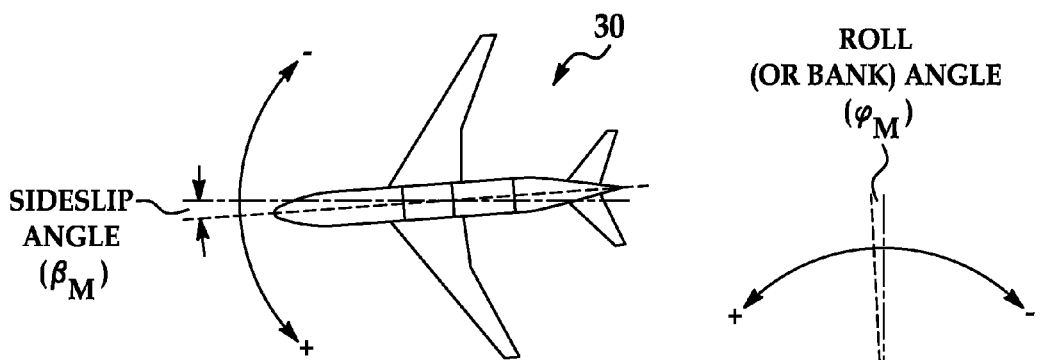
Figure 2C:
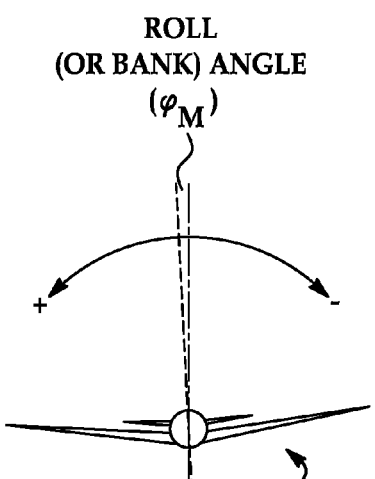
Figure 2B:
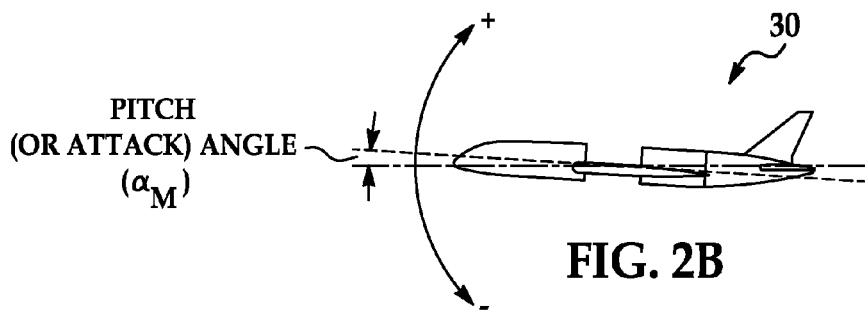
Figure 3:
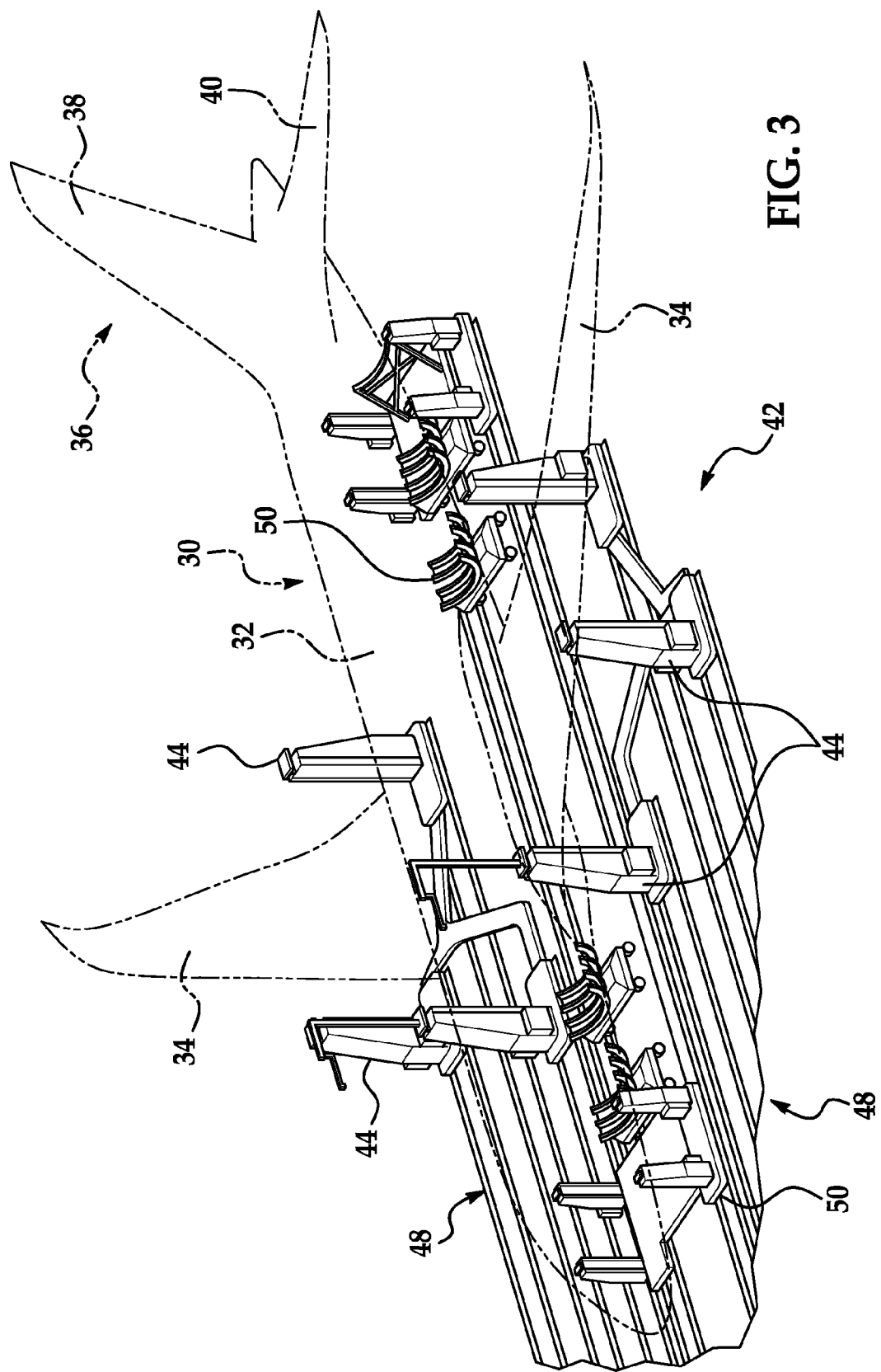
FIG. 3 is a perspective view illustrating a jacking system used to assemble components of an airplane, the outline of an airplane being indicated in the phantom.
Figure 4:
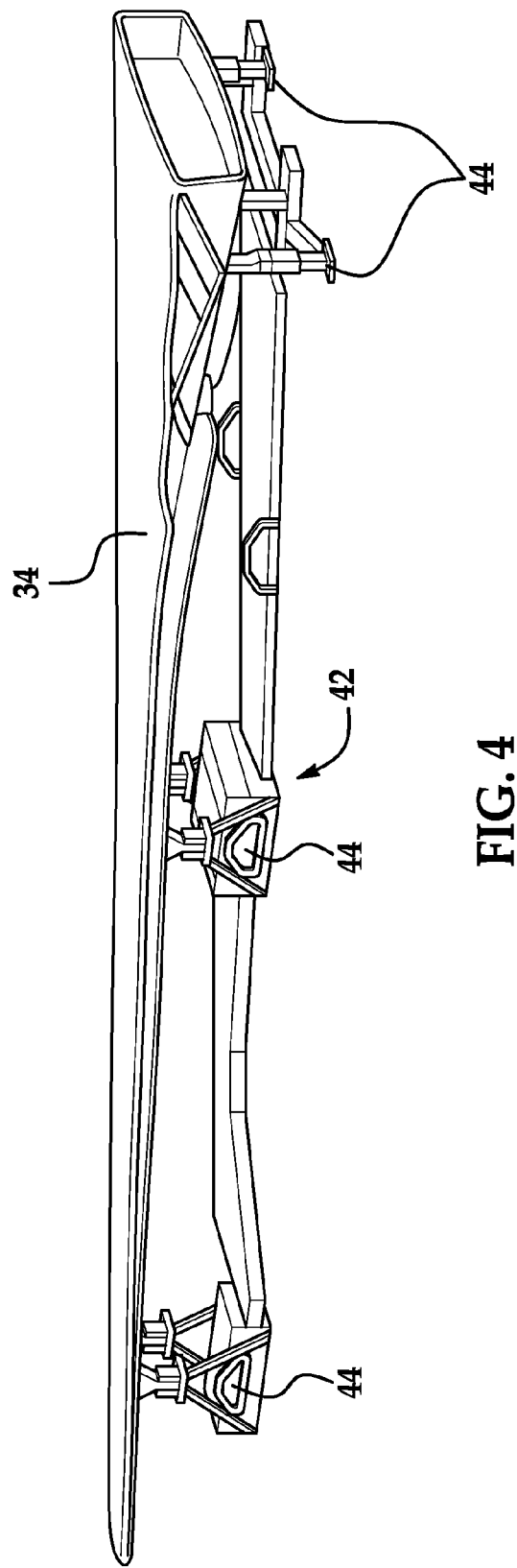
FIG. 4 is a perspective view illustrating components of the jacking system supporting an airplane wing.

Referring now also to FIGS. 2A-2C, the predicted cruise orientation of the as-built airplane 30 may be represented by three components that are angular offsets from the nominal orientation of the as-built airplane 30. Offset pitch angle ("pitch") or offset angle of attack, $\alpha_M$, is angular rotation ("roll") about the Y axis of the nominal cruise orientation. Offset sideslip angle, $\beta_M$, is angular rotation ("yaw") about the Z axis of the nominal cruise orientation. Offset roll angle or offset bank angle, $\phi_M$, is angular rotation about the X axis of the nominal cruise orientation.

As will be discussed below in more detail, during final assembly of the airplane 30, major components such as the fuselage 32, wings 34, and a tail assembly 36 are moved into aligned relationship and joined together. Some of the major components such as the wings 34, vertical stabilizer and horizontal stabilizer 40 include aerodynamically significant surfaces whose relative orientation affects the flight performance of the airplane 30. During the final assembly process, the major components of the airplane 30 are aligned and joined so that the aerodynamically significant features or surfaces are oriented relative to each other as close as possible to a nominal orientation providing optimized flight performance. However, due to slight variations in the components, tolerance stack-ups or other factors, the final orientation of these aerodynamically significant features of the as-built airplane 30 may vary from the nominal orientation. It is therefore important to determine the cruise orientation or "line of flight" of each as-built airplane 30 so that flight controls and avionics on the airplane 30 can make appropriate adjustments that compensate for the variation from the nominal orientation, and thereby optimize flight performance of the airplane 30.

In accordance with the disclosed embodiments, the line of flight of the as-built airplane is determined after the components are assembled and joined based on the actual position of the components, including the relative orientation of the aerodynamically significant surfaces of these components. According to the disclosed embodiments, the line of flight is transferred to a location inside the airplane 30 where it is recorded as a physical reference on the airframe of the airplane 30. This physical reference, representing the line of flight of the as-built airplane 30, may then be used to initialize and/or calibrate various flight controls and avionics in order to maximize flight performance of the airplane 30. Before discussing details of the method for determining and transferring the line of flight of the as-built airplane 30 it will be helpful to describe a suitable system for aligning the components during the final assembly process, including measuring the locations of aerodynamically significant features of the components in a common coordinate system which may also be used to determine the line of flight of the airplane 30, as built.

Referring concurrently to FIGS. 1-4, a jacking system 42 (FIG. 3) is used to support and move components of the airplane 30 into final assembly positions that are calculated by an external measurement system (not shown). The jacking system 42 may include moveable support members such as jacks 44 and fuselage carriages 50 that are mounted for movement on rails 44. In the illustrated example, jacks 44 are used to support and move wing sections 34, however similar jacks (not shown) may be employed to support and move the tail assembly 36 into final assembly position. The jacks 44 may be capable of moving a wing section 34 along any of multiple axes in order to precisely align the wing sections 34 with the fuselage 32. Based on the known position of each of the components, the jacking system 42 moves the components into their final assembly positions using movements that are automatically determined. The optimal displacement of the jacks 44, as well as the final assembled position of the components are also automatically determined.

The automatic movement of the jacks 44 is controlled by a computer (not shown) which uses data files representing the known position of the components within a common, three dimensional coordinate system. A system and method for locating the components within the three dimensional coordinate system is more fully described in U.S. patent application Ser. No. 11/977,986 filed Oct. 26, 2007, the entire contents of which are incorporated by reference herein. Using the known position of the components of the as-built airplane 30, the cruise orientation or line of flight of the airplane 30 may be predicted using the method and system disclosed in U.S. patent application Ser. No. 12/002,147 filed Dec. 13, 2007, the entire contents of which are incorporated by reference herein. Briefly, this method for predicting cruise orientation of the as-built airplane 30 involves inputting the nominal orientation of the as-built airplane; automatically computing deviation from the nominal orientation; and, applying the computed deviation from the nominal orientation to the nominal orientation in order to derive the cruise orientation. The deviation from the nominal orientation may be automatically computed by inputting angular variation of one or more aerodynamically significant features of the as-built airplane 30 relative to the nominal orientation, and automatically transforming the variations into angular offsets of the nominal orientation.

As will be described later in more detail, the final position of the jacks 44, and the known positions of the aerodynamically significant features of the components of the as-built airplane 30 may be used to calculate the line of flight which is then physically transferred to a location inside the airplane 30 where a physical record of the line of flight is established, such as on the airframe 192 (FIG. 14) of the airplane 30.

Figure 5A:
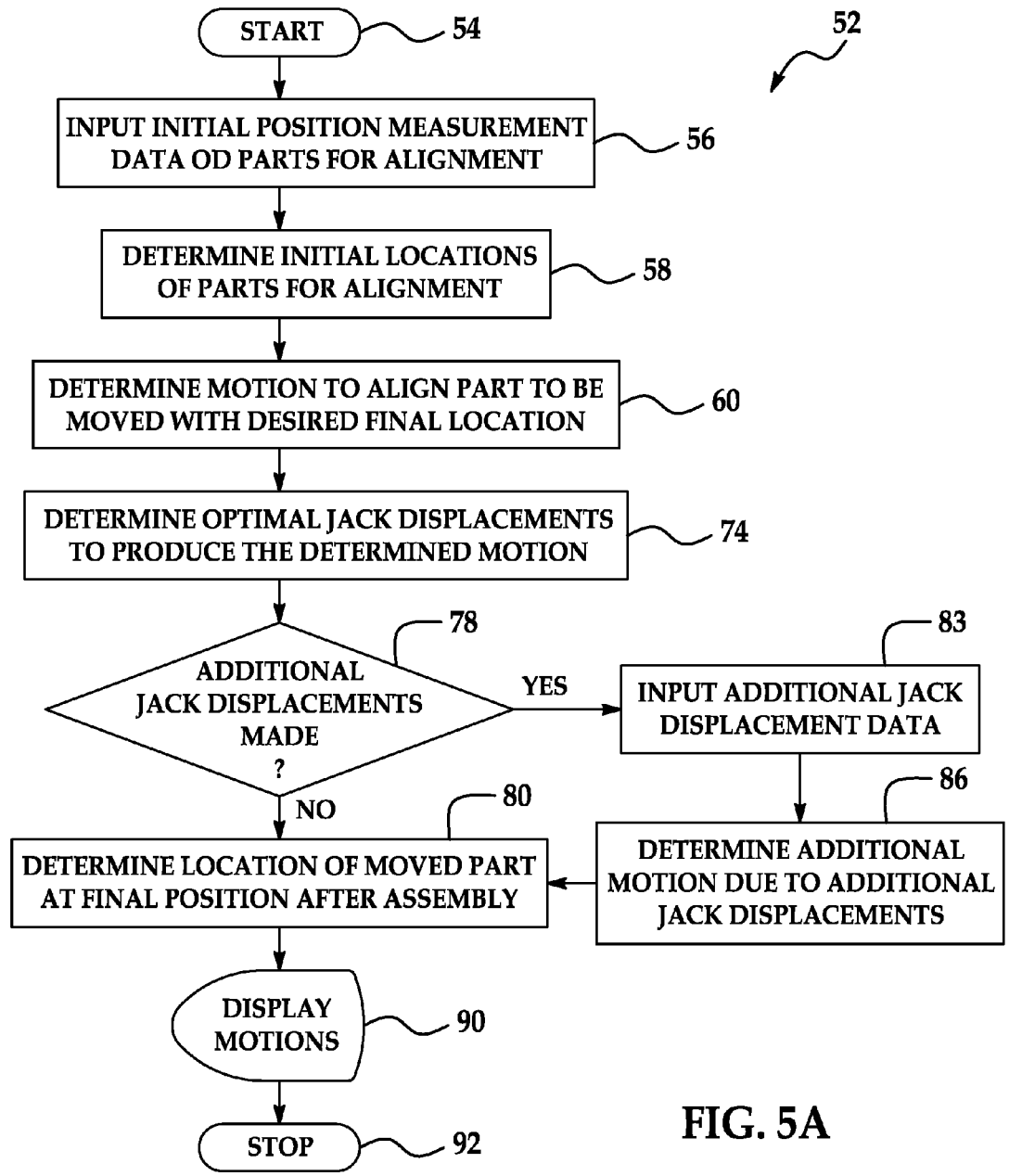
FIGS. 5A-5E are flowcharts of an illustrative method for computing assembly jack locations to align components for assembly.

Before describing the system and method for transferring the line of flight, a method will be described for computing the location of the jacks 44 that are used to align the components during the assembly process. Referring now to FIG. 5A, a method 52 for computing assembly jack locations to align components for assembly begins at block 54. The method 52 may comprise a computer-executable method that uses measured locations of components to compute assembly jack locations to align those components for assembly into a structure. It should be emphasized here that the desired final location of the component to be moved is defined by a measurable position and orientation. The measurable position and orientation may include, for example and without limitation: fixed coordinates and directions in a GPS coordinate system; fixed monuments on a factory floor; or a stationary component of the desired structure to be assembled which is already located in its final position and into which the movable component is aligned and moved (and hence defines the desired final location of the component to be moved). For purposes of illustration only and without any limitation whatsoever, this desired final location will be referred to herein and shown in the drawings as a stationary component of the structure to be assembled.

At block 56 measured initial positions of components for alignment are input into suitable computer processing components (discussed further below). The initial positions that are measured are locations of known reference points on assembly interfaces of at least one component to be moved and a stationary component (into which the movable components are to be moved, thereby assembling the structure). The locations can be measured in any manner desired, such as without limitation in terms of azimuth and elevation and converted into coordinates in a coordinate system of the structure to be assembled.

The locations can be measured with any suitable measurement or metrology system as desired, for a particular application. For example and without limitation, the locations can be measured with a laser radar system, a laser tracker system, a photogrammetry system, an indoor global positioning system or infrared global positioning system, or the like. Given by way of example and not of limitation, a suitable system (that uses infrared global positioning system technology) for measuring locations of known reference points on assembly interfaces of at least one component to be moved and a stationary component (into which the movable components are to be moved) is set forth in U.S. patent application Ser. No. 11/977,986 filed Oct. 26, 2007 referred to above.

At block 58 initial locations of the component(s) to be moved and the stationary component are determined from the initial position measurement data input at the block 56. As mentioned above, location entails components of position and orientation in space. At block 60, motion to align the component(s) to be moved with the desired final location, such as the stationary component, is determined.

The concepts of location and motion as used herein are inter-related. As such, the following discussion explains both (i) determination of initial locations at block 58 and (ii) determination of motion at block 60.

In explaining location and motion, the following notational conventions are used herein: (i) 3×3 matrices are represented by bold face capital letters: A, B, C, etc.; (ii) 3D vectors are represented by bold face lower case letters: a, b, c, etc.; (iii) scalars (for example, angles) are in non-bold face lower case letters: a, b, c, etc., or by lower case Greek letters: α, β, γ, etc.; and (iv) components and features are represented by non-bold face capital letters: A, B, C, etc.

Within the above context, a rigid motion in space is a combination of rotation and translation in space. A mathematical rigid motion in this sense can be thought of either (i) as a physical change of location with respect to a fixed coordinate system or (ii) as a transformation between two different coordinate systems. Embodiments disclosed herein use the same representation for both.

The locations and motions used in the embodiments disclosed herein are not intended to be limited to rigid motions. The locations and motions could, for example, include elastic deformations. However, some measurement technology and assembly jack systems currently in use are not capable of dealing with elastic deformations. Therefore, for the sake of brevity, rigid motions will be discussed to explain the non-limiting, illustrative embodiments disclosed herein.

Representations of locations and motions in space involve matrices and angles. Mathematically, a rigid motion can be thought of as a combination of a 3×3 rotation matrix U and a 3-dimensional translation vector t. These are often combined into a single 4×4 matrix, which is mathematically equivalent to the form used herein. If x represents the coordinates of a point before the motion and x' represents the coordinates of the point after the motion, then $$x'=Ux+t. \tag{1}$$

where Ux represents matrix multiplication of the 3×3 matrix U and the 3×1 matrix (i.e., vector) x. In some contemplated manufacturing scenarios, both (i) an upstream variation simulation process (in which components and structures are designed and in which trade studies are performed) and (ii) factory floor assembly processes use this representation of a rotation as a 3×3 matrix.

Figure 6A:
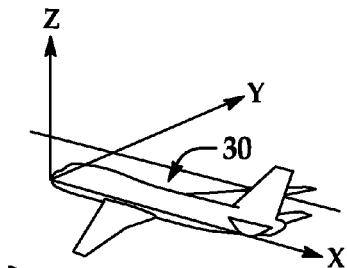
FIG. 6A illustrates an illustrative coordinate system.

Referring additionally to FIG. 6A, an illustrative system of Euler angles is used in some embodiments. An illustrative coordinate system of an airplane 30 includes an X axis, a Y axis, and a Z axis. An illustrative system of Euler angles (θ, φ, ψ) is described as follows: rotate through angle θ about an X axis, then through angle φ about an original (that is, un-rotated) Y axis, then through angle ψ about an original (that is, un-rotated) Z axis. The use of un-rotated axes for rotation is well adapted to a factory floor application. While an order in which the rotations are applied may be chosen arbitrarily, the same order is to be used consistently throughout the application. This consistency is entailed because different orders produce different results in 3-space (as will be discussed further below).

There is a mathematically exact transformation between Euler angles and rotation matrices except in a few special cases. For the particular scheme of Euler angles defined above, these special cases occur where cos φ=0 when the mapping back from matrices to Euler angles becomes ambiguous. Thus, when φ=±90° each choice of φ corresponds to a different choice of θ. However, either choice of φ and θ leads back to the same rotation matrix. It will be noted, though, that φ=±90° is not expected to occur for contemplated applications of disclosed embodiments.

Figure 6B:
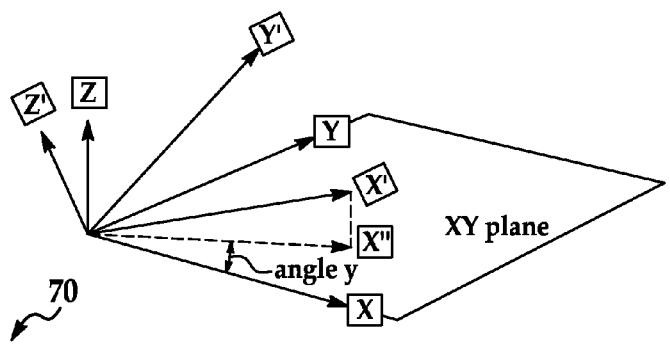
FIG. 6B illustrates planar projection angles.

Referring additionally now to FIG. 6B, for purposes of measuring rotations from a physical object and for predicting aerodynamic effects, Euler angles are not as appropriate as planar projection angles. Planar projection angles are defined procedurally as follows:

r=roll angle. Let Y"=the projection of the rotated Y' axis onto the un-rotated YZ plane. Then r is the angle between Y" and the un-rotated Y axis.

p=pitch angle. Let X"=the projection of the rotated X' axis onto the un-rotated XZ plane. Then p is the angle between X" and the un-rotated X axis.

y=yaw angle. Let X"=the projection of the rotated X' axis onto the un-rotated XY plane. Then y is the angle between X" and the un-rotated X axis.

The above definitions of planar projection angles are adapted to components of some structures that are assembled by some embodiments (for examples, structures such as airplane and maritime vessels that have roll, pitch, and yaw axes). However, it will be appreciated that other similar definitions could be made for different applications.

There is a mathematically exact transformation between the planar projection angles (r, p, y) and the Euler angles (θ, φ, ψ), and hence to rotation matrices U, which is numerically stable as long as all of the angles have magnitude bounded below 90°. It will be noted that this is the case for contemplated applications of disclosed embodiments.

Because all planar projection angles are measured independently, there is no arbitrary choice of order involved. When all angles are small (such as on the order of 1° or less), the difference between planar projection angles and the set of Euler angles used in disclosed embodiments is negligible. It will also be noted that this, too, is the case with all planar projection angles used in contemplated applications of disclosed embodiments.

Thus, determining motion at the block 60 (FIG. 5A) entails an application of point registration that finds a rigid motion which relates the coordinate system defined by a set of nominal (as-designed) points $\{x_1, x_2, x_3, \ldots\}$ to a corresponding set of as-built points $\{y_1, y_2, y_3, \ldots\}$. The rigid motion can be found in two ways—a point cloud registration and a datum target registration. Whether a point cloud registration is used or a datum target registration is used in a particular case depends on the indexing plan for joining the components in question.

The first registration method—the point cloud registration method—is a best-fit method that is used when there is a number N>3 of measurement points, and the registration is to be based by "best fitting" all of them simultaneously. In one embodiment, the best fit could be, illustratively and without limitation, a least-squares fit. Mathematically, the least-squares point cloud registration method finds a rigid motion in the form x'=Ux+t such that the sum of squares of all the residuals $$\sum_{i=1}^{N} |y_i - x'_i|^2$$

is minimized over all possible U and t. This operation suitably may be done by a standard method described in K. S. Arun, T. S. Huang, and S. D. Blostein; "Least Square Fitting of Two 3-D Point Sets"; IEEE Transactions on PAMI, 9(5):698-700, 1987. In some embodiments, if desired the mathematical software that does this computation may be the same software as that which is used in the vendor software used for variation simulation by engineering personnel for component and structure design and trade studies.

The second registration method—the datum target registration method—is used when, instead of considering all the measurement points equally, a hierarchical structure is imposed. An example of such a method is the 3-2-1 method described as follows:

Define a primary coordinate plane X=0 to pass through points $x_1, x_2, x_3$.

Define a secondary coordinate plane Y=0 to pass through points $x_4$ and $x_5$, while being perpendicular to the primary.

Define a tertiary coordinate plane Z=0 to pass through the point $x_6$ while being perpendicular to both the primary and the secondary.

The mechanics of this procedure are defined by national and international standards, such as without limitation *Dimensioning and Tolerancing*, ASME Y14.5M-1994, American Society of Mechanical Engineers, New York, 1995. As with the point cloud registration method, if desired this procedure may be followed both in the disclosed embodiments and in the vendor software used for variation simulation by engineering personnel.

Determining the motion at the block 60 entails combining rigid motions. Before combining rigid motions is explained, combining rotations will first be explained. Combining two rotations is done by matrix multiplication. Thus, if the first rotation has matrix V and the second has matrix U, then the operation of performing the first rotation and then the second has matrix UV. The order matters, because with matrix multiplication in general UV≠VU. For example, referring back to FIG. 6A, rotating 90° about the X axis leaves the airplane 62 with its left wing pointed down but the nose pointed forward, and a further rotation of 90° about the Y axis points the nose straight up. However, starting with the rotation about Y points the nose up, and following with the rotation about X points the nose to the left. Reversing a rotation represented by the matrix U is done by taking the matrix inverse $U^{-1}$.

Combining rigid motions is similar to combining rotations, except that the translation vectors must also be combined. In disclosed embodiments, there are two basic scenarios that involve combining rigid motions: (i) motion to align two components; and (ii) orientation of an aerodynamically significant feature. Other applications are merely combinations of these scenarios.

Figure 5B:
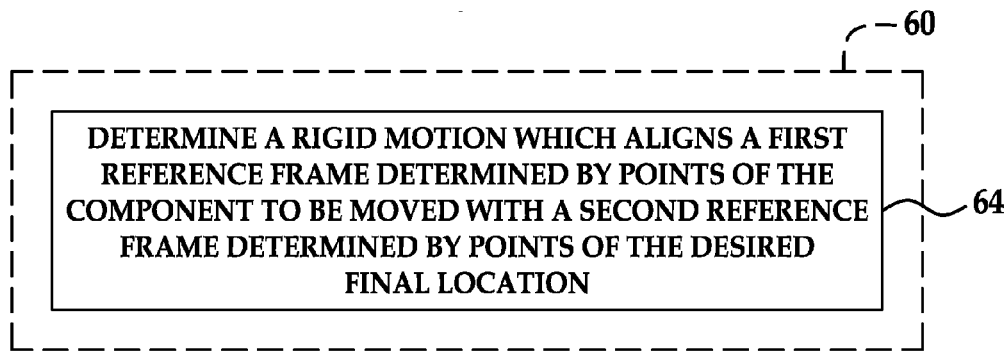
Figure 6C:
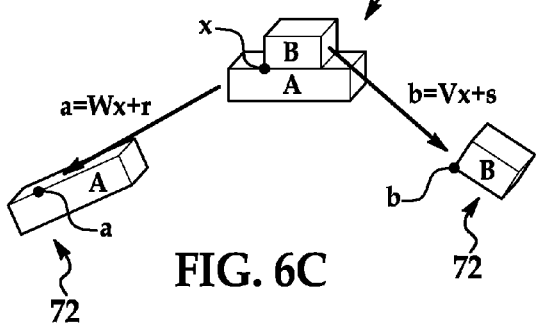
FIGS. 6C-6E illustrate computation of rigid motion to align a movable component with a final location.
Figure 6D:
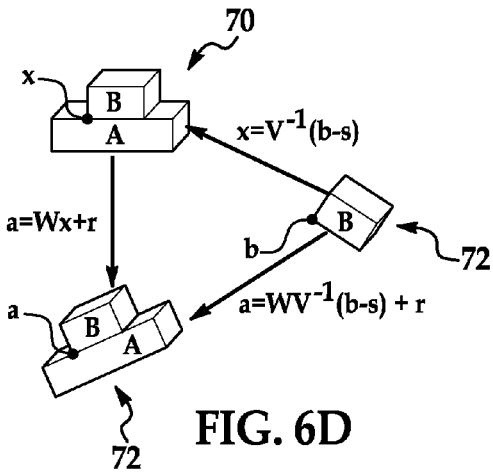

First, motion to align two components will be discussed. Referring now to FIGS. 5A and 5B, determining motion to align the component(s) to be moved with the desired final location, such as the stationary component, at block 60 entails processing at block 64, at which a rigid motion is determined which aligns a reference frame determined by points of the component(s) to be moved with a reference frame determined by points of the desired final location, such as the stationary component. Referring additionally to FIGS. 6C and 6D, given by way of non-limiting example component A is to remain fixed and component B is to move during a join. Let the nominal measurement points of A be $\{a_1, \ldots, a_N\}$ with corresponding measured points $\{a'_1, \ldots, a'_N\}$. Similarly, the nominal measurement points of B are $\{b_1, \ldots, b_M\}$ with corresponding measured points $\{b'_1, \ldots, b'_M\}$. There is no requirement for the nominal points on A to be the same as those on B, or even that N=M. At block 22, a rigid motion a=Ub+t is computed which aligns the reference frame defined by the points $\{b'_1, \ldots, b'_M\}$ of B with the reference frame defined by the points $\{a'_1, \ldots, a'_N\}$ of A.

Figure 5C:
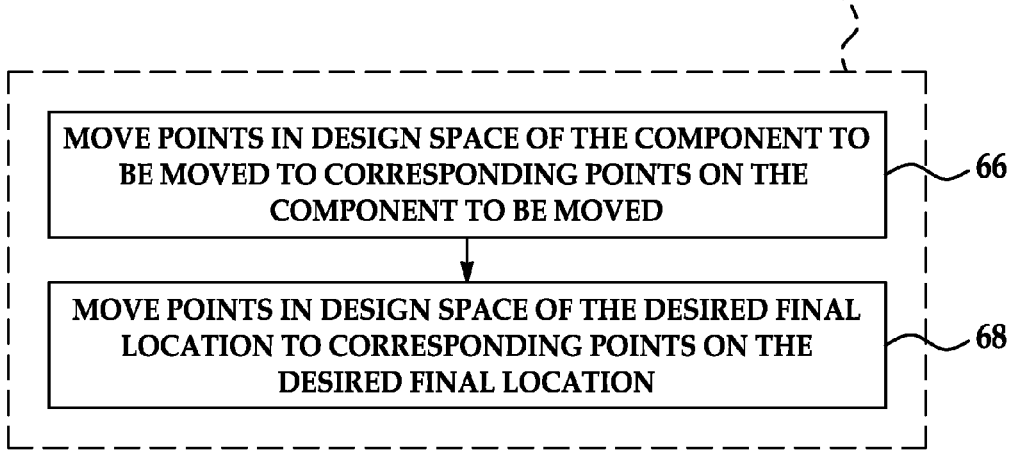

Referring additionally to FIG. 5C, in some embodiment's determination of the rigid motion at block 64 is performed in two stages. In the first stage, at block 66, points in design space of the component(s) to be moved are moved to corresponding points on the component(s) to be moved and at block 68 points in design space of the desired final location, such as the stationary component, are moved to corresponding points on the final location, such as the stationary component. As shown in FIG. 6C, the components A and B are aligned in design space 70. At the block 66 a rigid motion b=Vx+s is found which moves every point x in design space 70 to its corresponding point b on the component B on a factory floor 72. Similarly, at block 68 a rigid motion a=Wx+r is found that moves an arbitrary point x in design space 70 into its corresponding point a on the component A on the factory floor 72.

In the second stage, the motion a=Ub+t is determined. The equation b=Vx+s is solved for x, giving $x=V^{-1}(b-s)$, which is then substituted into the equation a=Wx+r to get $$a = WV^{-1}(b-s) + r = WV^{-1}b + r - WV^{-1}s = Ub + t$$

where $$U = WV^{-1}, \text{ and } t = r - WV^{-1}s = r - Us.$$

Thus, the rigid motion a=Ub+t can be applied to points on the component(s) to be moved (that is, the component(s) B) from their initial locations on the factory floor 72 (that was determined at the block 16 (FIG. 5A)) such that the component(s) B will be aligned with the stationary component A at the location of the stationary component A on the factory floor 30 (that was also determined at the block 58 (FIG. 5A)) in the same manner that they are aligned in design space 28.

Figure 6E:
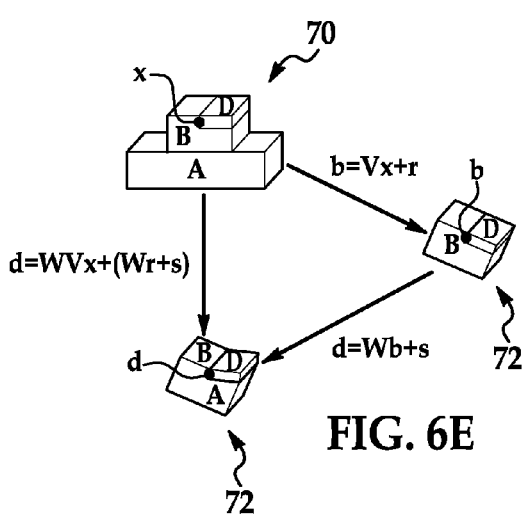

Referring additionally now to FIG. 6E, in some instances the component B may contain a feature D that is subject to manufacturing variation. That is, the feature D may not be in its nominal location with respect to the datum reference frame defined by the points $\{b_1, \ldots, b_M\}$. In such a case a motion d=Ux+t is found that carries the nominal location of any point x on the feature D to its actual location on the factory floor 72. Let b=Vx+s be a rigid motion that locates the reference points $\{b_1, \ldots, b_M\}$ on the factory floor 72, and let d=Wb+r be a rigid motion that locates the feature D with respect to the datum reference frame defined by the reference points $\{b_1, \ldots, b_M\}$. Then the transformation is given by:

$$d=Wb+r=W(Vx+s)+r=WVx+Ws+r=Ux+t$$

where $$U=WV, t=Ws+r.$$

Referring back to FIG. 5A, after the rigid motion b'=Ub+t has been determined, at block 74 optimal displacements of assembly jacks are determined that will produce the determined motion for the component(s) to be moved into alignment with the stationary component. The assembly jacks that support the component(s) to be moved and the stationary component have axes that desirably are aligned with axes of the coordinate system of the airplane to be assembled (and therefore with the factory floor coordinate system in which the components are measured).

Figure 5D:
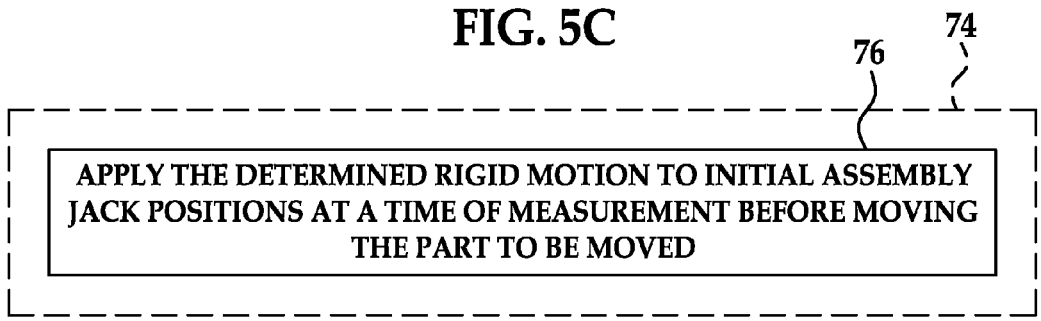

Referring additionally to FIG. 5D, determining the optimal assembly jack displacements entails processing at block 76 at which the determined rigid motion is applied to initial assembly jack positions at a time of measurement before moving the component(s) to be moved. Thus, displacements of the assembly jacks (upon which the component(s) to be moved are supported) that were determined at the block 74 will result in the determined rigid motion to align the component(s) to be moved with the stationary component.

Referring back to FIG. 5A, at a decision block 78 a determination is made whether additional assembly jack displacements have been made after the component(s) has been moved on the assembly jacks into alignment with the desired final location, such as the stationary component. For example, additional assembly jack displacements may be made by assembly mechanics to adjust the actual location of the moved component(s) from the computed optimal location for the moved component(s) at the final set location in which the stationary component and the moved component(s) are fastened together.

Figure 5E:
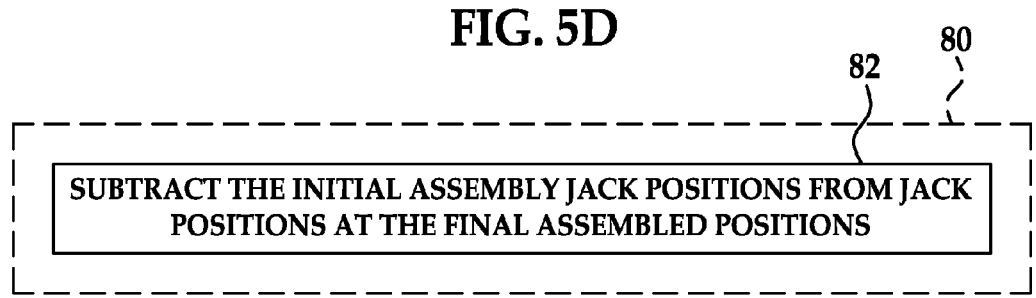

If no additional assembly jack displacements have been made, then at block 80 the location of the moved component(s) at a final assembled position is determined. Referring additionally to FIG. 5E, determining the location of the moved component(s) at a final assembled position entails processing at block 82 at which the initial assembly jack positions are subtracted from jack positions at the final assembled positions. If the axes of the jack system are not aligned with the axes of the common factory floor coordinate system, an additional rotational correction is applied to express the jack delta motions in terms of the jack axis directions.

If additional assembly jack displacements have been made, then at block 83 additional data is input regarding additional assembly jack displacements made by assembly mechanics to adjust the actual location of the moved component(s) from the computed optimal location for the moved component(s) at the final set location. For example, assembly jack control processing can measure the difference between the pre-computed optimal jack locations and the locations at final set. At block 86, additional motion due to additional assembly jack displacement is determined. For example, from the measured differences between the pre-computed optimal jack locations and the locations at final set a rotation that represents the motion from initial set to final set can be determined. This rotation suitably is reported in the form of planar projection angles, as described above. The planar projection angles may be transformed to Euler angles, and then to 3×3 matrix form. However, because these delta angles typically will be small in contemplated applications of disclosed embodiments, the Euler angles ($\theta$, $\phi$, $\psi$) can be taken to be equal to the planar projection angles (r, p, y). Processing then proceeds to the block 80 as described above.

At block 90 motions are displayed. Euler angles suitably are used to communicate information about rotations to assembly mechanics on the factory floor because Euler angles contain more easily interpreted information than a 3×3 matrix. Precision in these numbers is required only when the numbers become small, at which point the Euler angles are substantially the same as planar projection angles. The method 52 stops at block 92.

Figure 7:
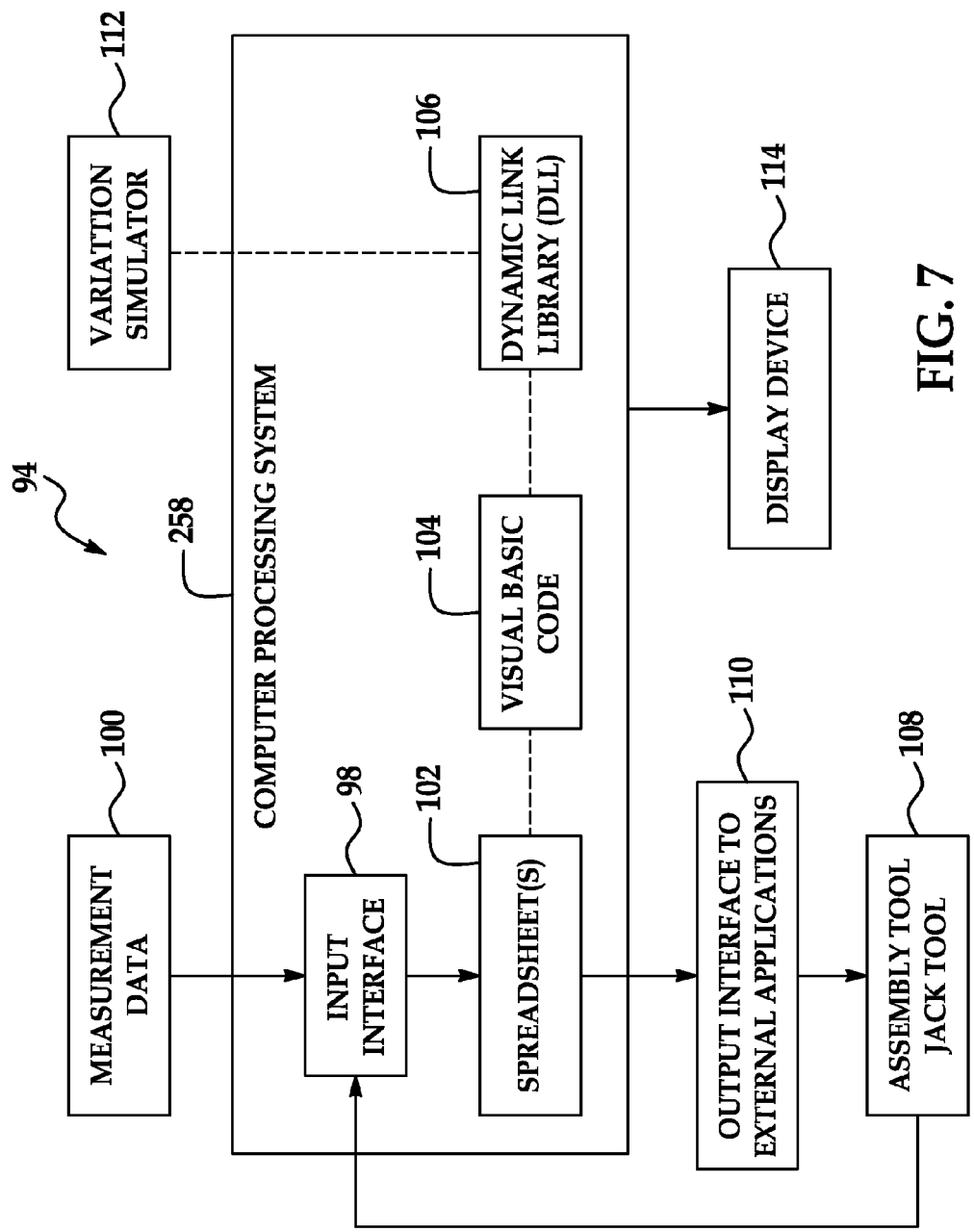
FIG. 7 is a block diagram of an illustrative system for computing assembly jack locations to align components for assembly.
Figure 9:
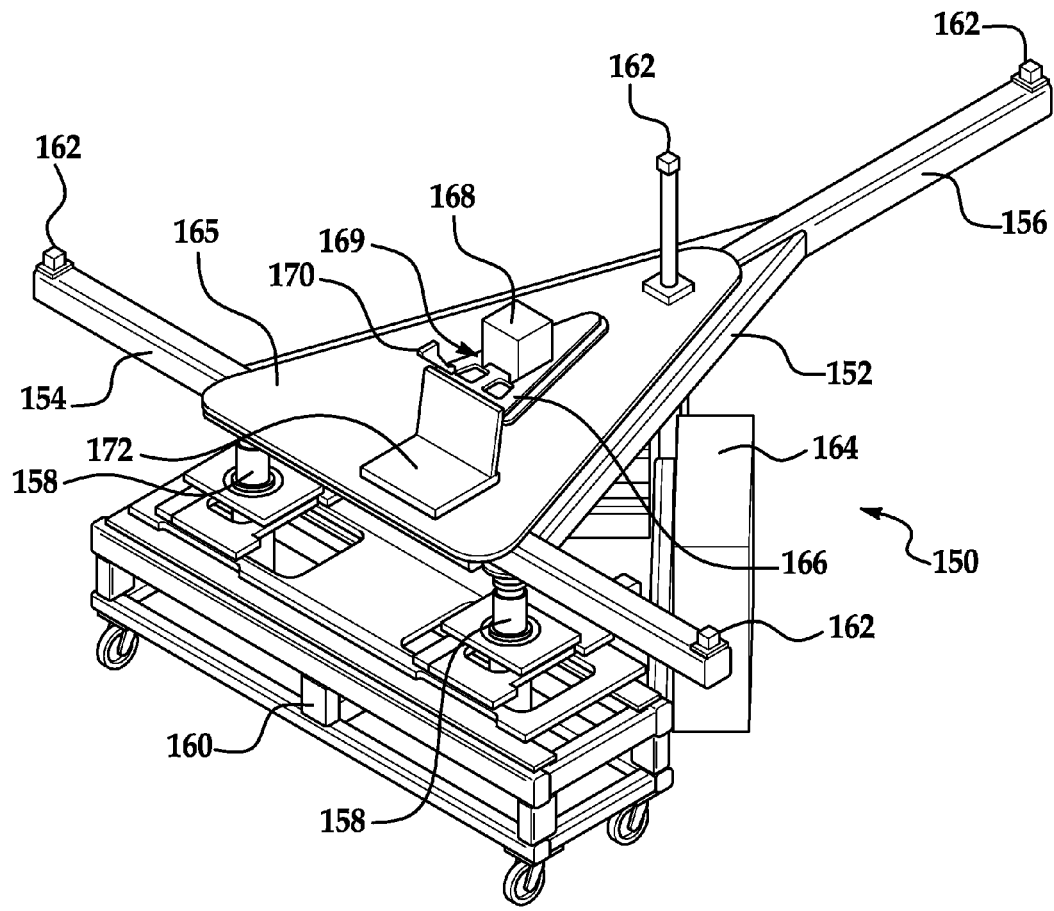
FIG. 9 is a perspective view of a tool used in calculating and transferring a line of flight into an airplane.
Figure 10:
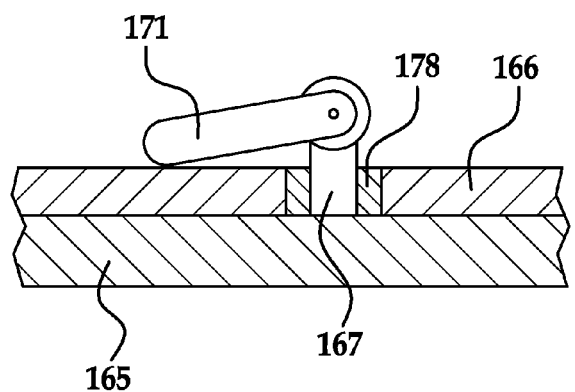
FIG. 10 is a cross sectional view taken along the line 10-10 in FIG. 9.
Figure 11:
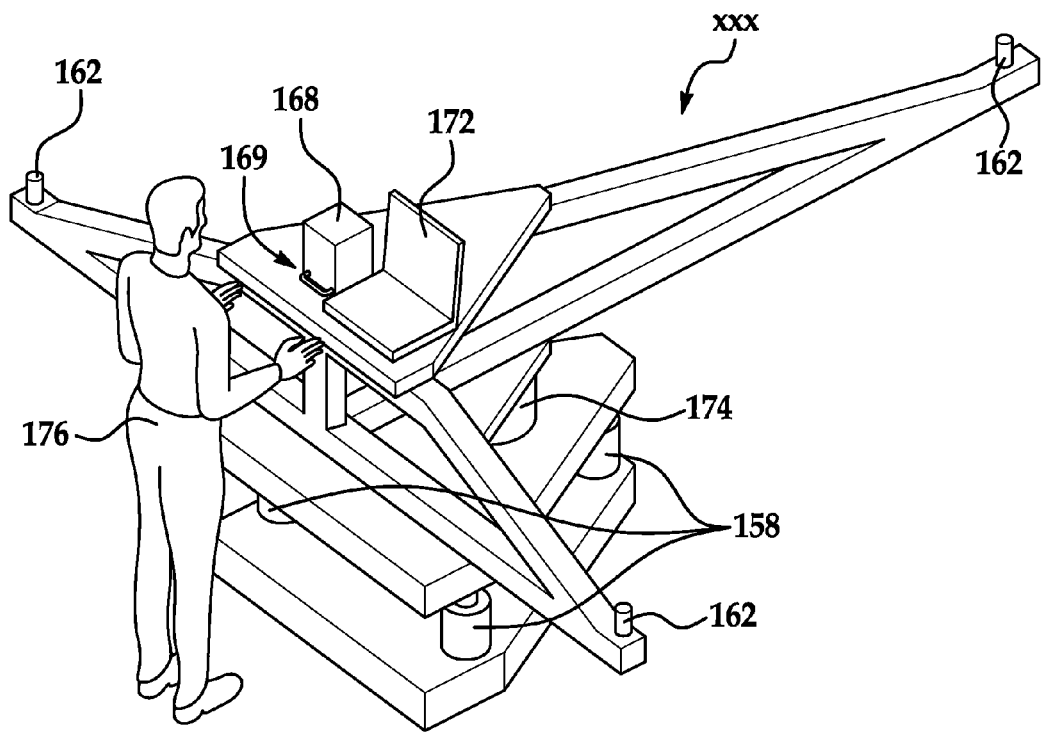
FIG. 11 is a perspective view of the tool shown in FIG. 9, better illustrating servo motors used to orient the tool reference surface.
Figure 12:
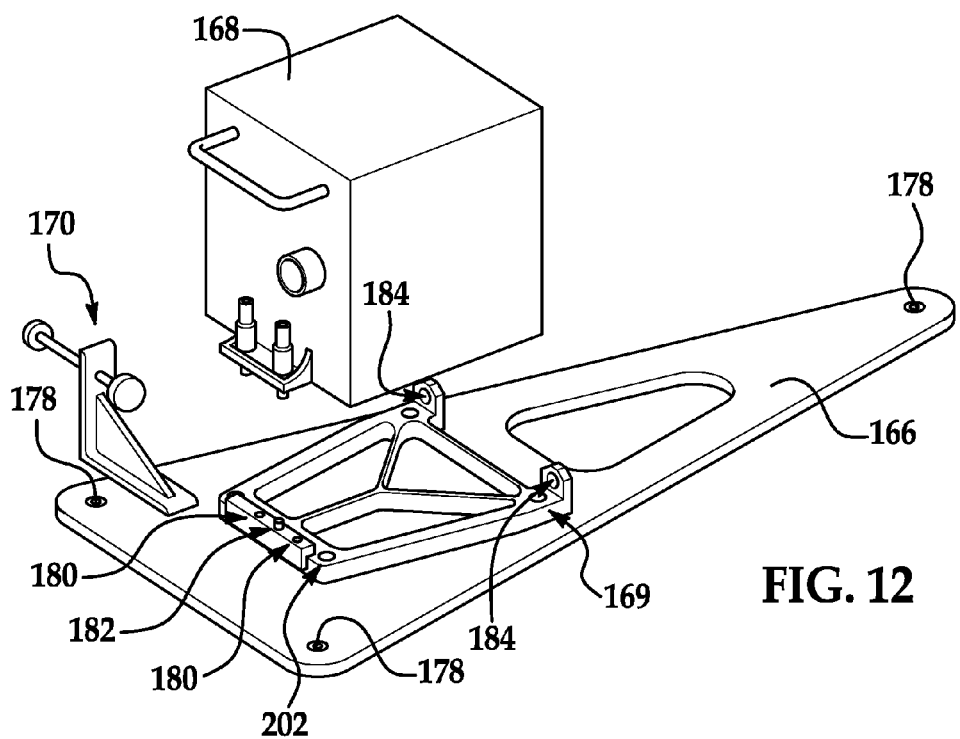
FIG. 12 is an exploded, perspective view showing details of the tool reference surface and inertial reference unit.
Figure 13:
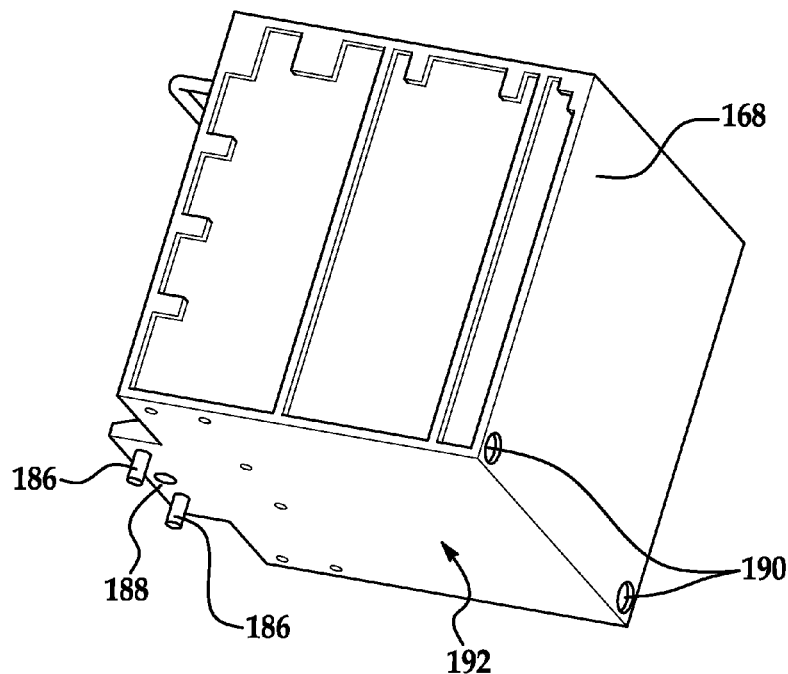
FIG. 13 is a perspective view of the inertial reference unit.

Referring now to FIG. 7, a system 94 is provided for computing assembly jack locations to align components for assembly. A computer processing system 96 includes an input interface 98. Measurement data 100 regarding initial position of the components for alignment is provided to the input interface 98.

In an illustrative embodiment, computer processing components of the computer processing system execute one or more spreadsheets 102, visual basic code 104, and routines from a dynamic link library 106. The spreadsheet 102 receives from the measurement system via the input interface 98 initial position measurement data from which the initial locations of the components to be assembled can be determined. The spreadsheet 102 passes the resulting optimal assembly jack positions to external applications, such as without limitation an assembly jack control 108 or other external processes as desired, via an output interface 110. The spreadsheet 102 receives feedback from the jack assembly control 108 via the input interface 98 on the actual locations of the jacks at final set.

In some embodiments, the spreadsheet computations can be divided into several separate spreadsheets as desired for a particular purpose. However, in some other embodiments the spreadsheet computations can be performed by a single spreadsheet. For purposes of clarity, the one or more spreadsheets 102 are referred to herein as the spreadsheet 102.

To perform its calculations, in some embodiments the spreadsheet 102 performs computations that use a mixture of spreadsheet formulas, the visual basic code 104 written in the Visual Basic for Applications (VBA) computer language (which is embedded in the spreadsheet 102), and the dynamic link library (DLL) 106 containing complex numerical computations which are implemented in the C computer language. If desired, the C code in turn also can be used by an upstream variation simulation process in a variation simulator 112. The purpose of this is to simulate the assembly effects of variation in individual components to perform variation management trade studies during the engineering design phase. The sharing of numerical algorithms and software between the engineering design and factory floor assembly stages enables the factory floor assembly process to be the same process that was simulated during engineering design studies.

A display device 114 is operatively coupled to the computer processing system 96 to display motions. As discussed above, Euler angles suitably are used to communicate information about rotations to assembly mechanics on the factory floor.

Figure 8B:
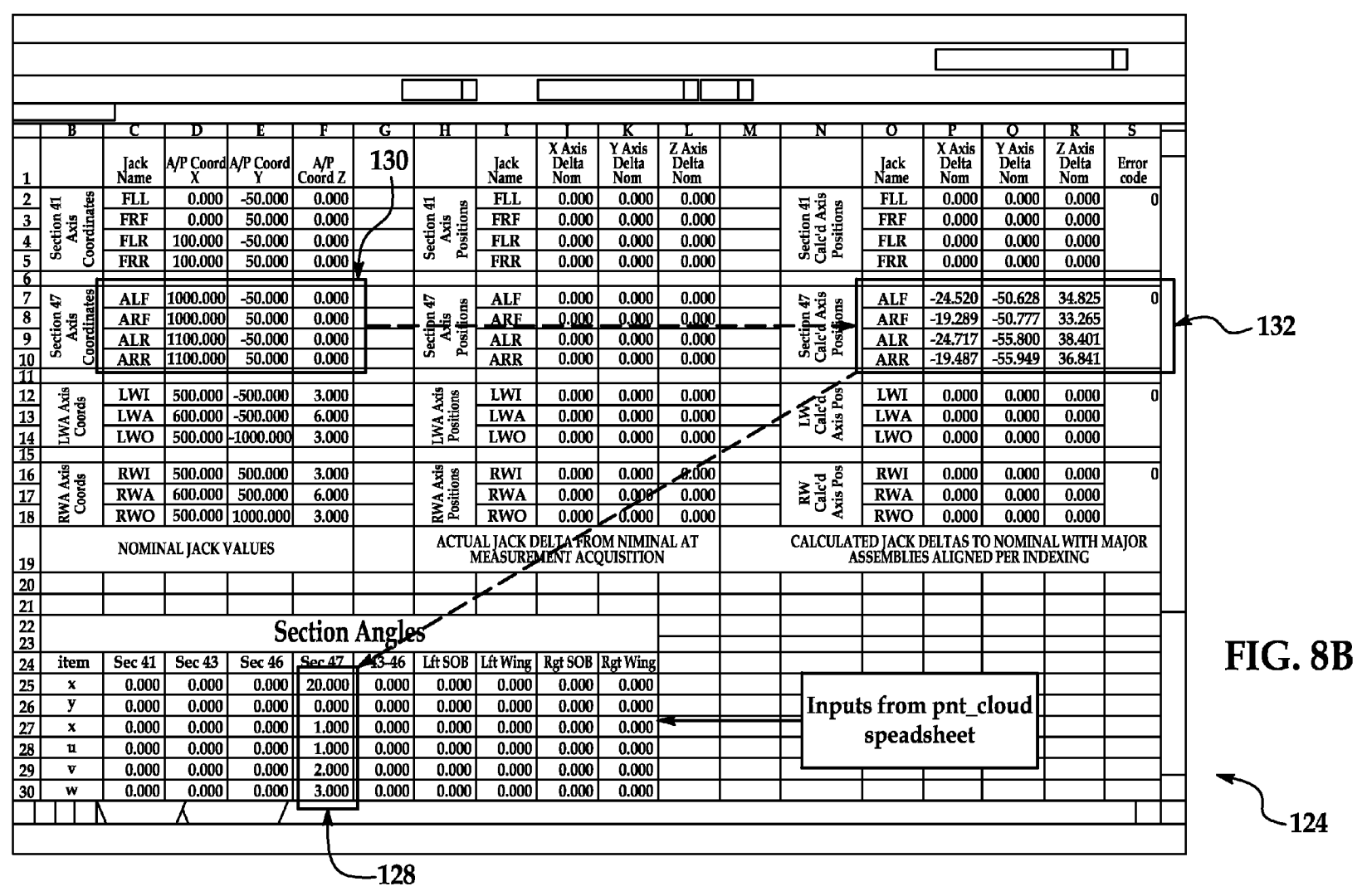

Referring now to FIGS. 8A-8C, illustrative screen shots show processing performed by the spreadsheet 102 (FIG. 7) in illustrative embodiments. Given by way of non-limiting example, the screen shots illustrate processing of data for assembling an airplane from fuselage sections. For purposes of clarity, the screen shots illustrate a simplified assembly scenario in which (i) all major assemblies (that is, fuselage sections) are in their nominal positions on the factory floor except the rear-most section of the fuselage (section 47) and (ii) all key features are at nominal orientation relative to their respective major assemblies except the vertical fin (which is attached to section 47). It will be appreciated that all numerical data shown on the screenshots are notional, and bear no relation to actual product data.

Referring now to FIG. 8A, in screen 116 cells 120 are populated with initial position measurement data 100 (FIG. 7) from the measurement system via the input interface 98 (FIG. 7) for ten target points on section 47, thereby executing processing of the block 56 (FIG. 5A). Data regarding nominal locations of the ten target points on section 47 are populated in cells 120. The measured data from the cells 118 and the nominal data from the cells 120 are combined to compute the initial location and orientation of section 47 with respect to the factory floor ERS coordinate system, thereby executing processing of the block 58 (FIG. 5A). Given by way of non-limiting example, the point cloud registration method was used to combine the measured data from the cells 118 and the nominal data from the cells 120 to compute the initial location and orientation of section 47 with respect to the factory floor ERS coordinate system. Resulting data for initial location and orientation of section 47 are populated in cells 122.

Referring now to FIG. 8B, in a screen 124 the data regarding location and orientation of section 47 from the cells 122 (FIG. 8A) are populated in cells 128. The data regarding location and orientation of section 47 from the cells 128 is combined with data in cells 130 regarding nominal assembly jack locations to produce desired assembly jack deltas (that is, displacements) to bring section 47 into alignment with the stationary fuselage section 46 (which is already in nominal location and alignment), thereby executing processing of the block 74 (FIG. 5A). These jack displacements bring section 47 into its optimal set position. Data regarding the jack displacements populate cells 132.

Referring now to FIG. 8C, in a screen 133 data regarding actual assembly jack deltas introduced by assembly mechanics in moving from the optimal set to final set populates cells 134, thereby executing processing of the blocks 83 and 86 (both FIG. 5A). The data from the cells 134 is used to compute section 47's orientation at final set, thereby executing processing of the block 80 (FIG. 5A). Resulting data regarding section 47's orientation at final set populates cells 132.

In various embodiments, portions of the system and method include a computer program product. The computer program product includes a computer-readable storage medium, such as a non-volatile storage medium, and computer-readable program code portions, such as a series of computer instructions, embodied in the computer-readable storage medium. Typically, the computer program is stored and executed by a processing unit or a related memory device, such as processing components of the computer processing system 96 depicted in FIG. 7.

In this regard, FIGS. 5A-5E, 7, and 8A-8C are flowcharts and control flow illustrations, block diagrams, and screen shots, respectively, of methods, systems, and program products, respectively, according to various embodiments. It will be understood that each block of the block diagram, flowchart and control flow illustrations, and combinations of blocks in the block diagram, and flowchart and control flow illustrations, can be implemented by computer program instructions. These computer program instructions may be loaded onto a computer or other programmable apparatus to produce a machine, such that the instructions which execute on the computer or other programmable apparatus create means for implementing the functions specified in the block diagram, flowchart or control flow block(s). These computer program instructions may also be stored in a computer-readable memory that can direct a computer or other programmable apparatus to function in a particular manner, such that the instructions stored in the computer-readable memory produce an article of manufacture including instruction means which implement the function specified in the block diagram, flowchart or control flow block(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block diagram, flowchart or control flow block(s).

Accordingly, blocks of the block diagram, flowchart or control flow illustrations support combinations of means for performing the specified functions, combinations of steps for performing the specified functions and program instruction means for performing the specified functions. It will also be understood that each block of the block diagram, flowchart or control flow illustrations, and combinations of blocks in the block diagram, flowchart or control flow illustrations, can be implemented by special purpose hardware-based computer systems which perform the specified functions or steps, or combinations of special purpose hardware and computer instructions.

As previously discussed, once the components of the airplane 30 have been moved into their final assembly positions and joined, it is necessary to determine the optimum cruise orientation or "line of flight" of the airplane 30 and to transfer this line of flight into the interior of the airplane 30 where it is embedded as a physical reference. This physical reference may be used to calibrate/initialize flight controls and avionics, and also provides a physical reference after the airplane 30 has been placed in service to aid in the recalibration of flight controls. In accordance with the disclosed embodiments, a system and method are provided for determining the optimized line of flight using the spatial measurements of components previously described, including the orientation of aerodynamic features. As described in detail above, these spatial measurements are used to displace the jacks 44 (FIGS. 3 and 4) which move the components to their final assembly position. The disclosed embodiments utilize data representing the final position of the jacks 44 to orient a transfer tool 150 which is used to establish the physical reference on the airframe of the airplane 30.

Referring now to FIGS. 9-13, the transfer tool 150 broadly comprises a frame 152 moveably mounted on a wheeled tool base 160. Three triangularly arranged servo controlled motors 158 are operated by a computer 172 to in order to displace the frame 152 about orthogonal axes corresponding to pitch and roll. A fourth servo controlled motor 174 is used to rotate the frame 152 about a third, yaw axis. Thus, the frame 152 is displaceable along pitch, roll and yaw axes determined by commands issued by the computer 172, which may comprise, for example, a programmed PC.

The frame 152 includes a base leg 154 and a center leg 156 extending perpendicular to the base leg 154. Two laser targets 162 are respectively mounted on the ends of the base leg 154, and a third laser target 162 is mounted on the end of the center leg 156. Further, a laser target 162 may be mounted on the frame 152, intermediate the ends of the center leg 156. The targets 162 may comprise, for example, conventional reflectors that are operative to reflect a laser beam forming part of a laser measurement system similar to that described in U.S. patent application Ser. No. 11/977,986 filed Oct. 26, 2007. The laser measurement system (not shown) effectively determines the 3-dimensional orientation of the frame 152 in space in terms of pitch, roll and yaw axes. A generally triangular plate 165 is secured to the frame 152 and provides a surface upon which the computer 172 and other devices may be mounted.

The tool 150 further includes a generally triangular, tool reference surface 166 which is removably mounted on plate 165 by means of pins 167 which extend through bushings 178 in the tool reference surface 166. Spring loaded keepers 171 may be employed to hold down the reference surface 166 against the mounting plate 165. A yaw adjustment 170 may be mounted on the tool reference surface 166 for purposes that will described later. An inertial reference unit (IRU) 168 is mounted on the tool reference surface 166 by means of a mounting bracket 169. The mounting bracket 169 is secured to the tool reference surface 166 and includes aperture 180 for receiving pins 186 along one edge of the inertial reference unit 168. Similarly, the IRU 168 includes apertures 190 on one side thereof which receive corresponding pins 184 formed in the mounting bracket 169. Finally, an aperture 188 in the inertial reference unit 168 between the pins 186 receives a corresponding pin 182 in the mounting bracket 169. The pins and apertures described immediately above removably mount the IRU 168 on the tool reference surface 166.

The IRU 168 may comprise, for example, a micro inertial reference system such as that commercially available from Honeywell Aerospace comprising an all digital, high performance ring laser gyro based initial reference system that provides digital outputs. Once initialized, the IRU 168 may record the three dimensional orientation of a body, such as the tool reference surface 166, and retains the recorded orientation when the tool reference surface 166 is moved to another location.

As will be described later, the final position of the servo jacks 44, which are related to the line of flight of the airplane 30, are delivered to the computer 172 as a data file that may be used by the computer 172 to control the servo motors 158, 174. The servo motors 158, 174, under control of computer 172, orient the tool frame 152, and thus the tool reference surface 166 to match the line of flight of the airplane 30, represented by the final position of the jacks 44. The orientation of the tool reference surface 166 representing the airplane's line of flight is recorded by the IRU 168. Thus, the line transfer tool 150 provides the physical and dimensional link between the external measurement system and the IRU 168.

Once the orientation of the tool reference surface 166 (representing the calculated line of flight) is recorded by the IRU 168 while outside of the airplane 30, the tool reference surface 166 having the IRU 168 mounted thereon is removed from the mounting plate 165 and transferred by a worker into the airplane 30 to a location where a physical reference is to be established that serves as a permanent record of the airplane's optimize line of flight. As the tool reference surface 166 is carried into the airplane 30, the IRU 168 maintains a record of the exact orientation of the tool reference surface 166 when it was displaced to an orientation representing the line of flight under the control of the computer 172.

Figure 14:
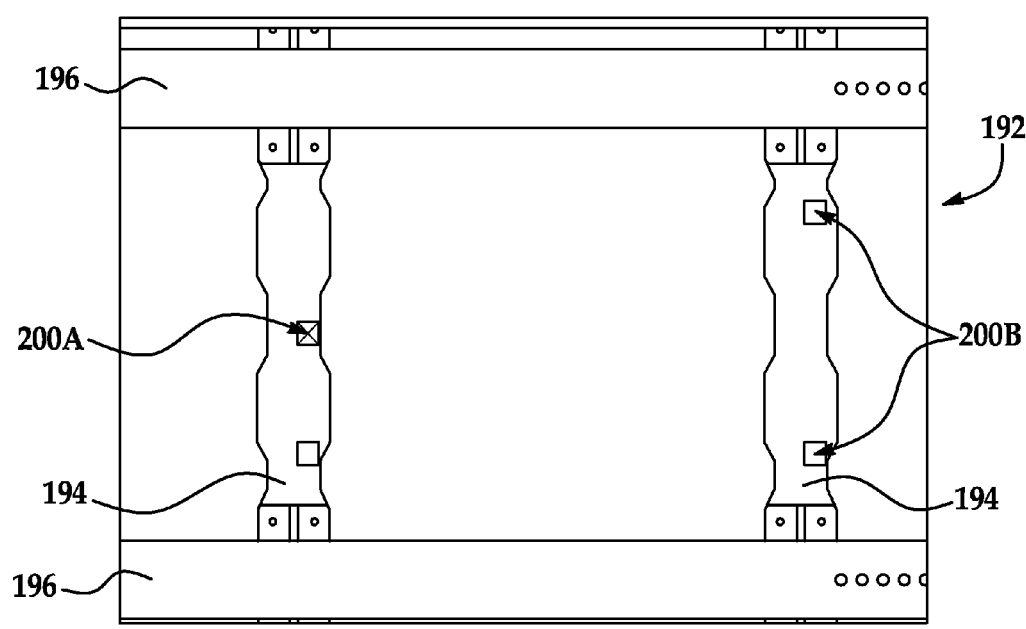
FIG. 14 is a plan view of a portion of an airframe, and illustrating mounting points for the tool reference surface.
Figure 15:
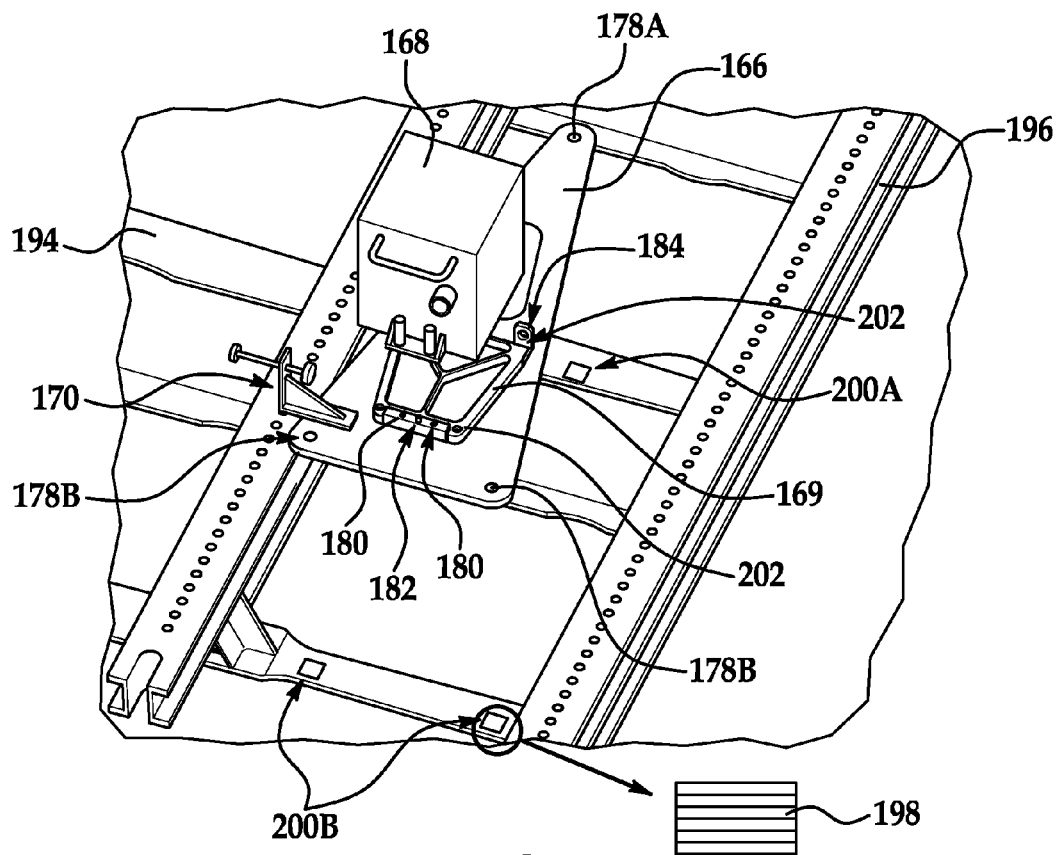
FIG. 15 is an exploded, perspective view of the tool reference surface relative to its mounted position on the airframe.
Figure 16:
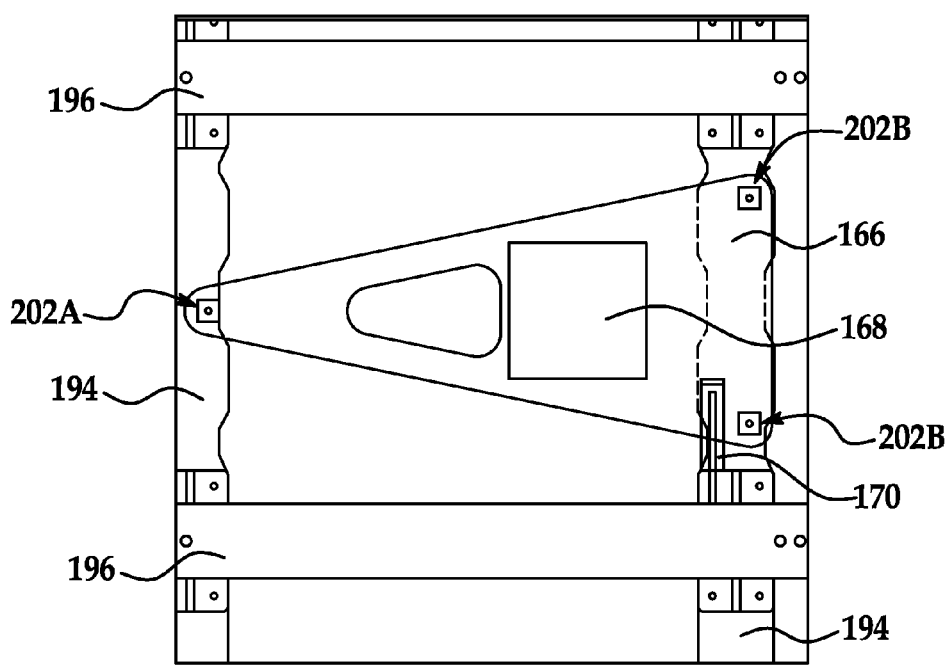
FIG. 16 is a view similar to FIG. 14, but illustrating the tool reference surface mounted on the airframe.

Referring also now to FIGS. 14-16, the airplane 30 includes an airframe 192 comprising longitudinally extending frame members 196 secured on transversely extending frame members 194. Three built up pads 200a, 200b are arranged in a triangle on beams 194 and each comprise flat, relatively thin, removable laminations 198. In one application, for example and without limitation, the laminated pads 200a, 200b each have a size of 1 inch×1 inch×0.2 inches wherein the thickness comprises multiple 0.003 inch thick laminations. The individual laminations 198 may be removed one at a time in order to adjust height of the corresponding pads 200a, 200b, which as will become apparent below, form hard points inside the airplane 30 on which the tool reference 166 surface may be mounted.

After the tool reference surface 166 has been displaced outside the airplane 30 to an orientation corresponding to the optimized line of flight of the airplane 30, and this orientation has been recorded by the IRU 168, the tool reference surface 166 with the IRU 168 mounted thereon is moved into the airplane 30 and is placed on the frame members 194 such that the forward drill bushings 178a are aligned over pad 200a, and the rear drill bushings 178b are respectively aligned over rear pads 200b. Laminations 198 are removed from the pads 200a, 200b, as required, until the orientation (pitch and roll) of the tool reference surface 166 correspond to those recorded in the IRU 168.

At this point, drill bushing 178a is used as a guide to drill a hole in the pad 200a, thereby fixing the forward portion of the tool reference surface 166 to the frame 194. Then, the yaw adjustment screw 170 is used to move the rear portion of the tool reference surface 166, in an arc around the forward end of the tool reference surface 166 which has been fixed to one of the frame members 194. The adjustment screw 170 bears against a frame member or stop (not shown) which can be fixed either to one of the frame members 194 or 196 to react against the tool reference surface 166. The adjustment screw 170 effectively adjusts the yaw position of the tool reference surface 166 until the yaw corresponds to that recorded by the IRU 168. Once the tool reference surface 166 has been adjusted into an orientation corresponding to the optimized line of flight recorded while the tool reference surface 166 was on the tool 150, holes are drilled in the pads 200a, 200b which act as a permanent record and physical reference of the optimized line of flight.

Figure 17:
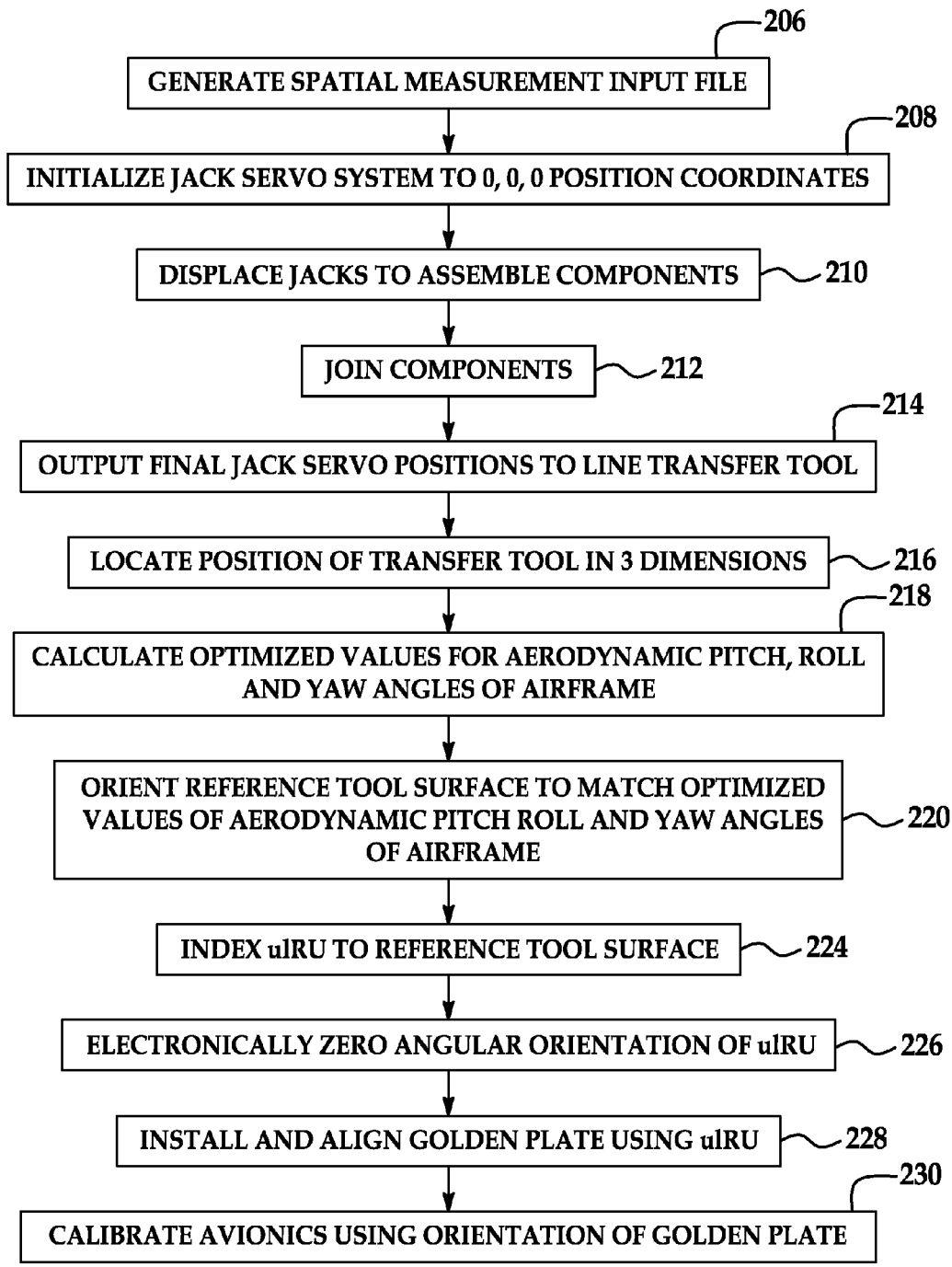
FIG. 17 is a flow diagram illustrating a method for calculating and transferring the line of flight into the airplane.

Attention is now directed to FIG. 17 which illustrates the basic steps of a method for transferring the line of flight into the interior of the airplane 30. Beginning at step 206, an input file is generated representing the spatial measurements of the components of the airplane 30 which are to be assembled. The servo jacks of the jacking system 42 are initialized to 0,0,0 position coordinates so that the servos are synchronized to the spatial measurements of the components in the same coordinate system. Next, step 210, the jacks 44 are displaced under control of a computer program in order to move and position the components into their final assembly position.

At step 212, the components are joined together, thus permanently fixing the relative orientation of the aerodynamic features of the components which determine the line of flight of the airplane. At 214, the final positions of the jack servos are transferred to the line transfer tool 150 where they are loaded into the computer 172. Next, at 216, the position of the tool reference surface 166 is determined in three dimensions. At step 218, the optimized values for aerodynamic pitch, roll and yaw angles of the airframe are calculated, following which, at step 220, the tool reference surface 166 is displaced by servos 158, 174 so that the tool reference surface 166 is brought into an orientation matching the optimized values for pitch, roll and yaw calculated at 218.

At step 224, the IRU 168 is initialized and then indexed to record the orientation of the tool reference surface 166 representing the optimized line of flight. At 226, the angular orientation of the IRU 168 is electronically zeroed, following which the tool reference surface 166 is removed from the transfer tool 120 installed on the airframe using the IRU 168. Finally, at step 230, avionics and other flight controls are calibrated based on the physical reference recorded on the airframe which represents the optimized line of flight.

Figure 18:
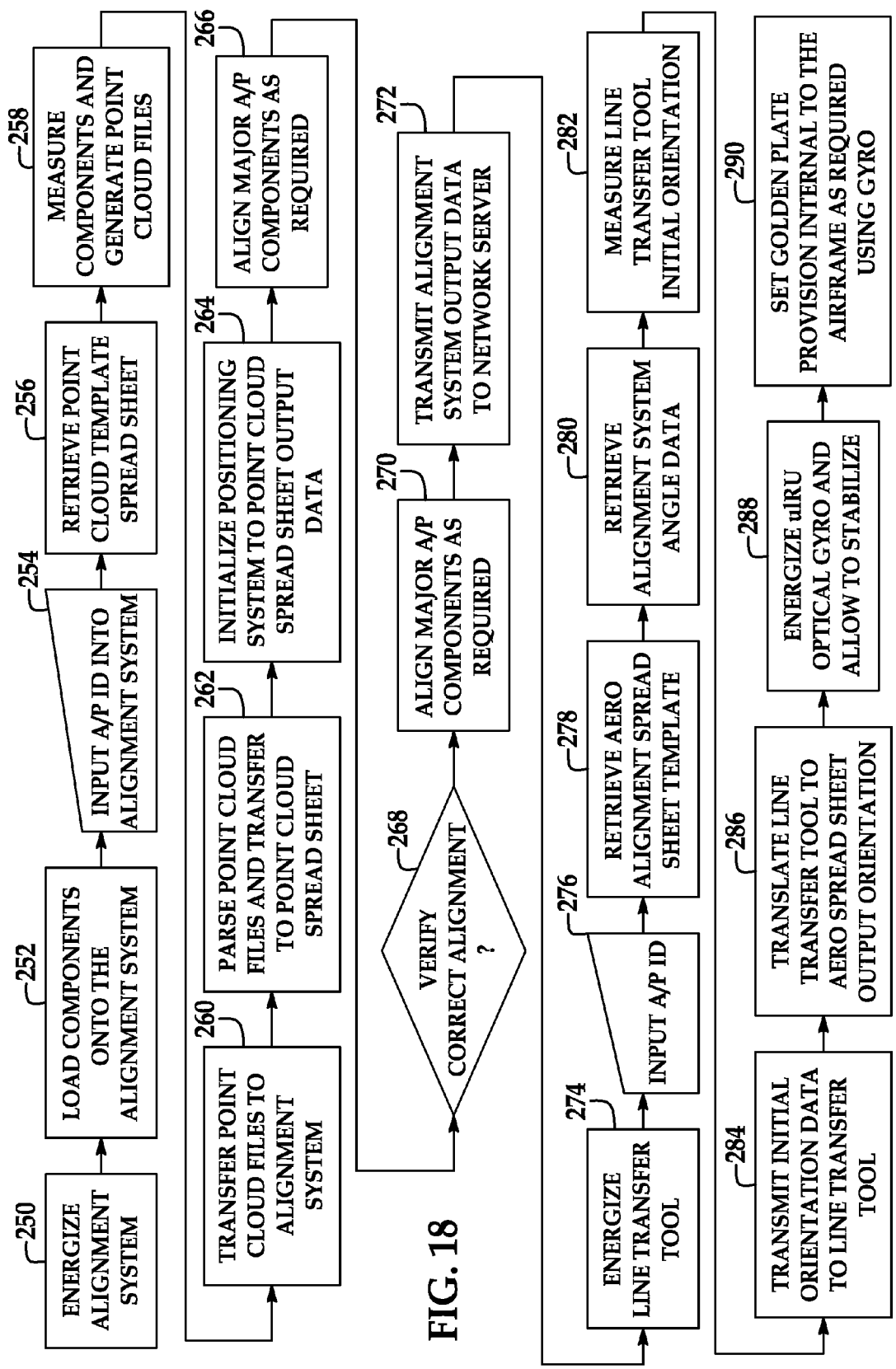
FIG. 18 is a flow diagram showing additional details of the method.

Additional details of the method are shown in FIG. 18. Beginning at 250, the alignment system is energized following which at 252 components of the airplane 30 are loaded onto the alignment system. The identification number (ID) of the airplane 30 is then input into the alignment system at 254. At 256 the point cloud template spreadsheet is retrieved. Then, at 258, the components are measured and the point cloud files are generated. The point cloud files are then transferred to the alignment system at 260 and at 262 the point cloud files are parsed and transferred to the point cloud spreadsheet.

At 264 the positioning system is initialized to the point cloud spreadsheet output data and the major airplane components are then aligned, as required at 266. Once the alignment of the components is verified as being correct at 268, alignment system output files are generated at 270 and the resulting output data is transmitted to a network server at 272.

At this point, the line transfer tool 10 is energized at 274 and the ID of the airplane 30 is input into the computer 172, as shown at step 276. The computer 172 then retrieves the aero-alignment spreadsheet template at 278 as well as the alignment system angle data as shown at step 280. The initial orientation of the line transfer tool 150 is measured at 282 and this orientation data is transferred to the computer 172 which forms part of the line transfer tool 150. At step 286, the line transfer tool 150 is translated to the aero spreadsheet output orientation and the IRU 168 is then energized at step 288, where, after the IRU optical gyros have been allowed to stabilize at 288, the IRU 168 is used to orient the tool reference surface on the airframe, as shown at step 290, thus establishing a physical reference on the airframe representing the optimized line of flight of the airplane 30.

Figure 19:
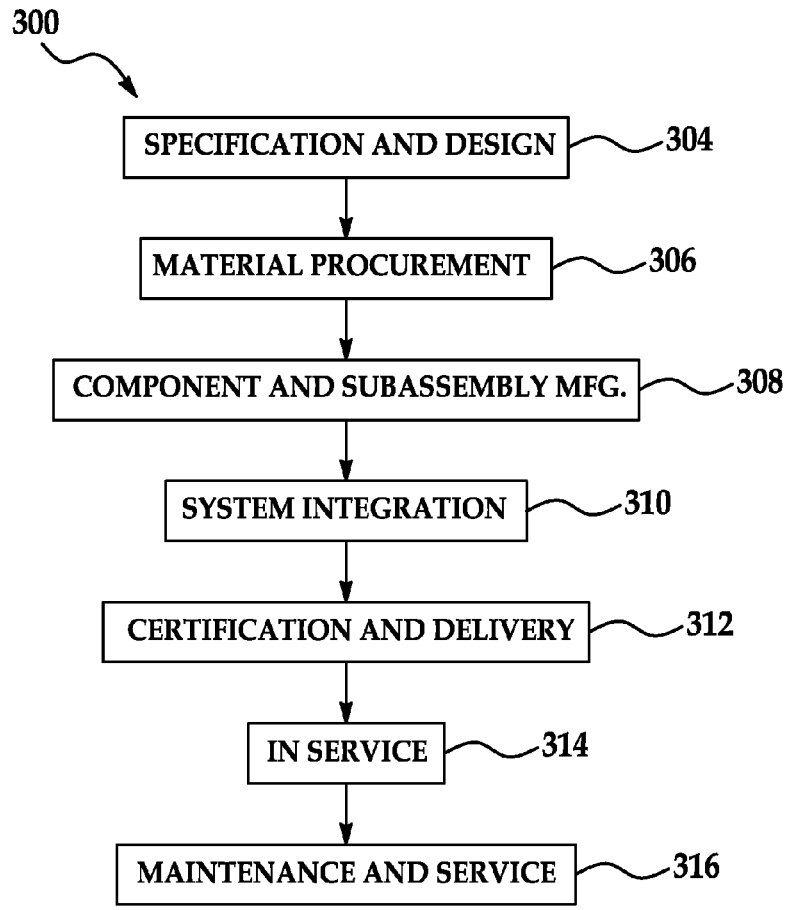
FIG. 19 is a flow diagram of airplane production and service methodology.
Figure 20:
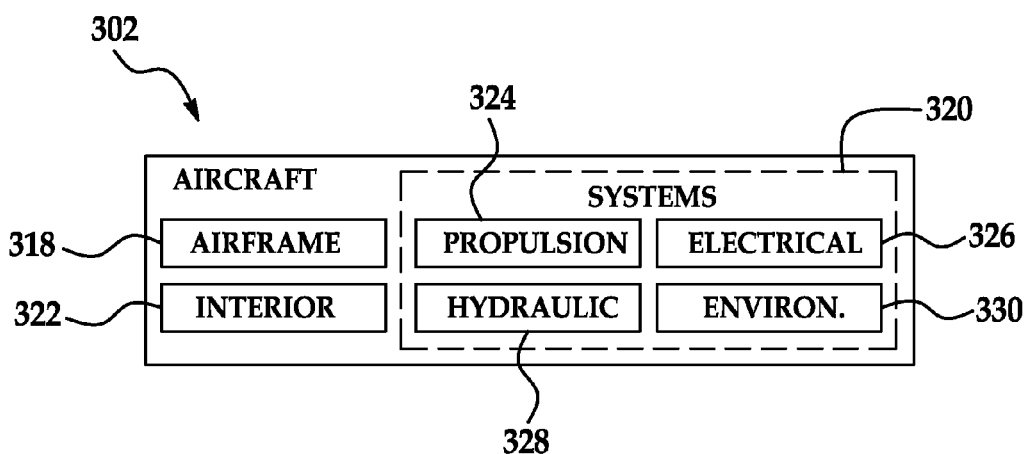
FIG. 20 is a block diagram of an airplane.

Embodiments of the disclosure may find use in a variety of potential applications, particularly in the transportation industry, including for example, aerospace, marine and automotive applications. Thus, referring now to FIGS. 19 and 20, embodiments of the disclosure may be used in the context of an airplane manufacturing and service method 300 as shown in FIG. 19 and an airplane 302 as shown in FIG. 20. During pre-production, exemplary method 300 may include specification and design 304 of the airplane 302 and material procurement 306. During production, component and subassembly manufacturing 98 and system integration 310 of the airplane 302 takes place. Thereafter, the airplane 302 may go through certification and delivery 312 in order to be placed in service 314.

While in service by a customer, the airplane 302 is scheduled for routine maintenance and service 3166 (which may also include modification, reconfiguration, refurbishment, and so on).

Each of the processes of method 300 may be performed or carried out by a system integrator, a third party, and/or an operator (e.g., a customer). For the purposes of this description, a system integrator may include without limitation any number of airplane manufacturers and major-system subcontractors; a third party may include without limitation any number of vendors, subcontractors, and suppliers; and an operator may be an airline, leasing company, military entity, service organization, and so on.

As shown in FIG. 20, the airplane 302 produced by exemplary method 300 may include an airframe 318 with a plurality of systems 320 and an interior 322. Examples of high-level systems 320 include one or more of a propulsion system 324, an electrical system 326, a hydraulic system 328, and an environmental system 330. Any number of other systems may be included. Although an aerospace example is shown, the principles of the disclosure may be applied to other industries, such as the marine and automotive industries.

Systems and methods embodied herein may be employed during any one or more of the stages of the production and service method 300. For example, components or subassemblies corresponding to production process 90 may be fabricated or manufactured in a manner similar to components or subassemblies produced while the airplane 302 is in service. Also, one or more apparatus embodiments, method embodiments, or a combination thereof may be utilized during the production stages 308 and 310, for example, by substantially expediting assembly of or reducing the cost of an airplane 302. Similarly, one or more of system embodiments, method embodiments, or a combination thereof may be utilized while the airplane 302 is in service, for example and without limitation, to maintenance and service 316.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A system used to establish a physical reference within an airplane representing an optimized line of flight for the airplane, comprising:
   a tool positioned outside the airplane and including a tool reference surface;
   means for calculating values for aerodynamic pitch, roll, and yaw of the airplane representing the optimized line of flight;
   means coupled with the calculating means for moving the tool reference surface to an orientation corresponding to the calculated values for aerodynamic pitch, roll, and yaw of the airplane representing the optimized line of flight; and means for transferring the orientation of the tool reference surface to a location inside the airplane.

2. The system of claim 1, further comprising means for generating a data file representing an as-built orientation of at least one aerodynamically significant feature of the airplane, and wherein the calculating means uses the data file to calculate the values of aerodynamic pitch, roll, and yaw representing the optimized line of flight of the airplane.

3. The system of claim 1, wherein the means for moving the tool reference surface includes servo motors for moving the tool reference surface about pitch, roll, and yaw axes.

4. The system of claim 1, wherein the means for transferring the orientation of the tool reference surface includes means mounted on the tool reference surface for recording the orientation of the tool reference surface.

5. The system of claim 4, wherein:
the recording means includes an inertial reference unit, and
the tool reference surface is removably mounted on the tool to allow the tool reference surface and the inertial reference unit to be moved into the airplane.

6. A system for assembling and optimizing the line of flight of an airplane, comprising:
a jacking system including servos for moving components of the airplane into a final assembly position;
a tool including a movable tool reference surface;
means for calculating values for aerodynamic pitch, roll, and yaw of the airplane representing the optimized line of flight based on the position of the servos;
means coupled with the calculating means for moving the tool reference surface to an orientation corresponding to the calculated values for aerodynamic pitch, roll, and yaw of the airplane; and
means for transferring the orientation of the tool reference surface to a physical reference inside the airplane.

7. The system of claim 6, wherein the tool includes a tool base disposed outside the airplane, and the tool reference surface is removably mounted on the tool base.

8. The system of claim 6, wherein the means for transferring the orientation includes an inertial reference unit mounted on the tool reference surface.

9. The system of claim 6, wherein the tool reference surface includes guides for establishing the physical reference inside of the airplane.

10. The system of claim 6, wherein:
the calculating means includes a computer, and
the servo motors are controlled by the computer.

11. The system of claim 6, wherein the servo motors include:
at least three servo motors for controlling the pitch and the roll of the tool reference surface, and
a fourth servo motor for controlling the yaw of the tool reference surface.

12. The system of claim 6, wherein the means for transferring the orientation of the tool reference surface includes a yaw adjusting device carried on the tool reference surface for adjusting the yaw of the tool reference surface inside the airplane.

13. A system for assembling components of an airplane, including a physical reference on an airframe of the airplane representing an optimized line of flight for the airplane, comprising:
a jacking system including servos for moving components of the airplane into a final assembly position;
computer means for determining an as-built orientation of one or more aerodynamically significant features of the airplane based on the final position of the servos and for calculating the values pitch, roll, and yaw representing the optimized line of flight for the airplane using the as-built orientation;
a tool assembly located outside the airplane, including a tool base and a tool reference surface;
a fastener system for removably mounting the tool reference surface on the tool base;
servo motors controlled by the computer means for moving the tool reference surface to an orientation substantially matching the calculated values of pitch, roll and yaw; and
an inertial reference unit mounted on the tool reference surface for recording the orientation of the tool reference surface when the servo motors have moved the tool reference surface to the orientation substantially matching the calculated values of pitch, roll, and yaw, and for reorienting the tool reference surface on the airframe to match the recorded orientation.

\* \* \* \* \*